United States Patent
Park et al.

(10) Patent No.: US 12,518,808 B2
(45) Date of Patent: Jan. 6, 2026

(54) DATA CONVERTER FOR CANCELLING OFFSET VOLTAGE

(71) Applicant: SAMSUNG ELECTRONICS CO., LTD., Suwon-si (KR)

(72) Inventors: Youngwoo Park, Suwon-si (KR); Tongsung Kim, Suwon-si (KR); Youngmin Kim, Suwon-si (KR); Seungjin Park, Suwon-si (KR); Seunghoon Lee, Suwon-si (KR); Chaekang Lim, Suwon-si (KR); Youngchul Cho, Suwon-si (KR); Youngdon Choi, Suwon-si (KR); Junghwan Choi, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 261 days.

(21) Appl. No.: 18/231,935

(22) Filed: Aug. 9, 2023

(65) Prior Publication Data
US 2024/0221795 A1     Jul. 4, 2024

(30) Foreign Application Priority Data

Dec. 29, 2022   (KR) .................... 10-2022-0189731

(51) Int. Cl.
    *G11C 7/10*        (2006.01)
    *H03F 3/45*        (2006.01)
    (Continued)

(52) U.S. Cl.
CPC ....... *G11C 7/1048* (2013.01); *H03F 3/45475* (2013.01); *H03K 5/24* (2013.01);
(Continued)

(58) Field of Classification Search
CPC .................................................... G11C 7/1048
See application file for complete search history.

(56) References Cited

U.S. PATENT DOCUMENTS

| | | |
|---|---|---|
| 7,973,596 B2 | 7/2011 | Eschauzier et al. |
| 8,816,892 B2 | 8/2014 | Huang et al. |
| | (Continued) | |

OTHER PUBLICATIONS

J.T. Wu, et al., "A 100-MHz pipelined CMOS comparator " IEEE Journal of Solid-State Circuits, vol. 23, pp. 1379-1385,(1988).

(Continued)

*Primary Examiner* — Douglas King
(74) *Attorney, Agent, or Firm* — Muir Patent Law, PLLC

(57) ABSTRACT

A data converter including an autozeroing circuit including a plurality of gain circuits having a first amplification circuit and a first capacitor connected to the first amplification circuit, the first amplification circuit performing a switch feedthrough offset cancellation operation of storing an offset voltage of the autozeroing circuit in the capacitor through a switch, a comparator circuit including a first input terminal and a second input terminal, the comparator circuit comparing a first input terminal voltage level of the first input terminal with a second input terminal voltage level of the second input terminal, a first switch unit connected between the autozeroing circuit and the comparator circuit, the first switch disconnecting the autozeroing circuit from the comparator circuit during the switch feedthrough offset cancellation operation of the autozeroing circuit, and a second switch unit connected between a first input signal line and a second input signal line.

5 Claims, 23 Drawing Sheets

(51) Int. Cl.
*H03K 5/24* (2006.01)
*H03M 1/06* (2006.01)

(52) U.S. Cl.
CPC ..... *H03M 1/0607* (2013.01); *H03F 2200/375* (2013.01); *H03F 2203/45044* (2013.01); *H03F 2203/45212* (2013.01)

(56) References Cited

U.S. PATENT DOCUMENTS

| | | |
|---|---|---|
| 8,957,794 B2 | 2/2015 | Verbruggen et al. |
| 9,197,238 B1 | 11/2015 | Nagaraj et al. |
| 9,871,517 B1 * | 1/2018 | Cheng .................... H03K 19/23 |
| 10,439,612 B1 * | 10/2019 | Johnson ........... G11C 29/50008 |
| 10,454,488 B1 | 10/2019 | Monangi |
| 11,367,471 B2 * | 6/2022 | Kavala ............. G11C 29/50008 |
| 11,444,580 B2 | 9/2022 | Biswas |
| 2021/0159895 A1 | 5/2021 | Kashmiri et al. |
| 2024/0221795 A1 * | 7/2024 | Park ........................ H03K 5/24 |

OTHER PUBLICATIONS

EECS, 247, Lecture 21, Nyquist Rate ADC: Comparator Design (2007).

* cited by examiner

DATA CONVERTER FOR CANCELLING OFFSET VOLTAGE

CROSS-REFERENCE TO RELATED APPLICATION

Korean Patent Application No. 10-2022-0189731, filed on Dec. 29, 2022, in the Korean Intellectual Property Office, is incorporated by reference herein in its entirety.

BACKGROUND

1. Field

A data converter for cancelling offset voltage is disclosed.

2. Description of the Related Art

As the demand for speeding up electronic systems, increasing data capacity, and consuming less power increases, semiconductor memories that are accessible faster, store more data, and use less power have been continuously developed. Semiconductor memories are generally controlled by providing commands, addresses, and clocks to a memory device. A variety of commands, addresses, and clocks may be provided by, for example, a memory controller. The command may control the memory device to perform various memory operations, for example, a read operation retrieving data from the memory device and a write operation storing data in the memory device. Data associated with the command may be provided between the memory controller and the memory device at a known timing relative to receipt and/or transmission by the memory device.

SUMMARY

Embodiments are directed to a data converter, including an autozeroing circuit including a plurality of gain circuits having a first amplification circuit and a first capacitor connected to the first amplification circuit, the first amplification circuit performing a switch feedthrough offset cancellation operation of storing an offset voltage of the autozeroing circuit in the capacitor through a switch, a comparator circuit including a first input terminal and a second input terminal, the comparator circuit comparing a first input terminal voltage level of the first input terminal with a second input terminal voltage level of the second input terminal, a first switch unit connected between the autozeroing circuit and the comparator circuit, the first switch disconnecting the autozeroing circuit from the comparator circuit during the switch feedthrough offset cancellation operation of the autozeroing circuit, and a second switch unit connected between a first input signal line and a second input signal line and the comparator circuit, the second switch unit respectively connecting the first input signal line and the second input signal line to the first input terminal and the second input terminal of the comparator circuit during the switch feedthrough offset cancellation operation of the autozeroing circuit.

Embodiments are directed to a memory device, including a plurality of signal pins, an on-die termination circuit providing an on-die termination resistance to each of the plurality of signal pins, and an impedance control calibration circuit configured to output a code signal for controlling impedance of each of the plurality of signal pins, the impedance control calibration circuit including a data converter performing a coarse code search operation and a fine code search operation, the code signal being generated by the coarse code search operation and the fine code search operation, wherein the impedance control calibration circuit performs the coarse code search operation in parallel during an offset cancellation operation of storing an offset voltage of the data converter in a capacitor.

Embodiments are directed to an operation method of a memory device, including performing an impedance control calibration operation on each of a plurality of signal pins, wherein a coarse code signal and a fine code signal for controlling impedance of each of the plurality of signal pins are generated by the impedance control calibration operation, providing an on-die termination resistance of each of the plurality of signal pins, using an on-die termination circuit coupled to each of the plurality of signal pins, and while generating the coarse code signal, performing an offset cancellation operation of storing an offset voltage of a data converter performing the impedance control calibration operation in a capacitor in parallel.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
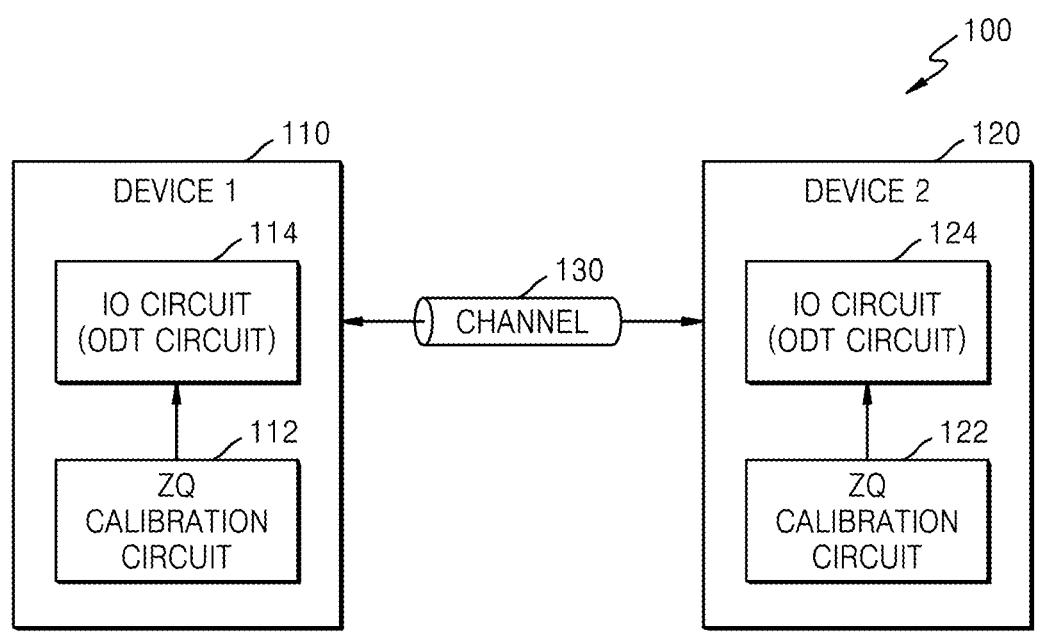
FIG. 1 is a block diagram showing an apparatus including a first device and a second device communicating with each other via a channel according to an example embodiment.

FIG. 1 is a block diagram showing an apparatus including a first device and a second device communicating with each other via a channel according to an example embodiment. Referring to FIG. 1, the apparatus 100 includes a first device 110 and a second device 120. The apparatus 100 may be implemented to be included in a personal computer (PC) or a mobile electronic device. The mobile electronic device may be implemented as a laptop computer, a mobile phone, a smart phone, a tablet PC, a personal digital assistant (PDA), an enterprise digital assistant (EDA), a digital still camera, a digital video camera, a portable multimedia player (PMP), a personal navigation device (PND) or a portable navigation device (PND), a handheld game console, a mobile Internet device (MID), a wearable computer, an Internet of Things (IoT) device, an Internet of Everything (IoE) device, or a drone. As used herein, the term "or" is not an exclusive term, e.g., "A or B" would include A, B, or A and B.

The first device 110 may be implemented as an integrated circuit (IC), a system on chip (SoC), an application processor (AP), a mobile AP, a chipset, or a set of chips. As an example, the first device 110 may be a semiconductor device that performs a memory control function, and may also be included in an AP. The AP may include a memory controller, random-access memory (RAM), a central processing unit (CPU), a graphics processing unit (GPU), and/or a modem.

The second device 120 may be implemented as a memory device. The memory device may be implemented as dynamic RAM (DRAM) or static RAM (SRAM). In an implementation, the second device 120 may correspond to double data rate synchronous dynamic random access memory (DDR SDRAM), low power DDR (LPDDR) SDRAM, graphics DDR (GDDR) SDRAM, Rambus DRAM (RDRAM). Alternatively, the second device 120 may be implemented as high bandwidth memory (HBM) or processor-in-memory (PIM).

According to embodiments, the second device 120 may be implemented as a nonvolatile memory device. In an implementation, the second device 120 may be implemented as flash memory or resistive memory such as phase change RAM (PRAM), magnetic RAM (MRAM), or resistive RAM (RRAM). Hereinafter, for convenience of explanation, the first device 110 is referred to as a memory controller and the second device 120 is referred to as a memory device. The memory device 120 is shown as a single semiconductor chip, but may actually include n (n is an integer other than 0, a non-zero whole number) memory devices.

The memory controller 110 and the memory device 120 may communicate with each other via a channel 130. The channel 130 may include a signal line physically or electrically connecting the memory controller 110 to the memory device 120. Ends of the channel 130 may be coupled to respective pins of the memory controller 110 and the memory device 120. The term "pin" refers broadly to an electrical interconnection to an integrated circuit (IC) and may include, e.g., a pad, a ball, or another electrical contact point on the IC. For brevity of the drawing, it is shown that a signal is transmitted through one signal line between the memory controller 110 and the memory device 120, but the channel 130 may actually include a clock signal line, a command/address bus, and a data bus.

The memory controller 110 may provide a command to the memory device 120 to perform a memory operation. Examples of a memory command may include a timing command for controlling the timing of various operations, an access command for accessing memory, e.g., a read command for performing a read operation and a write command for performing a write operation, a mode register write and read command for performing a mode register write and read operation.

In the operation, when a read command and a related address are provided to the memory device 120 by the memory controller 110, the memory device 120 may receive the read command and the related address, and perform a read operation to output read data from a memory location corresponding to the related address. The read data may be provided to the memory controller 110 by the memory device 120 according to timing related to the reception of the read command. In an implementation, the timing may be based on a read latency (RL) value representing the number of clock cycles after the read command when the read data is provided to the memory controller 110 by the memory device 120. The RL value may be set in the memory device 120 by the memory controller 110. In an implementation, the RL value may be programmed into a mode register set (MRS) of the memory device 120. A MRS of the memory device 120 may be programmed with information for setting various operation modes and/or for selecting characteristics for a memory operation. One of such settings may be related to the RL value.

In the operation, when a write command and a related address are provided to the memory device 120 by the memory controller 110, the memory device 120 may receive the write command and the related address, and perform a write operation to write the write data from the memory controller 110 to a memory location corresponding to the related address. The write data may be provided to the memory device 120 by the memory controller 110 according to timing related to the reception of the write command. In an implementation, the timing may be based on a write latency (WL) value representing the number of clock cycles after the write command when the write data is provided to the memory device 120 by the memory controller 110. The WL value may be programmed into the MRS of the memory device 120 by the memory controller 110.

To accurately perform the memory operation according to such operating timings, the memory controller 110 may perform memory training on the memory device 120. Memory training may include memory core parameter training associated with a memory core in the memory device 120 and/or peripheral circuit parameter training on peripheral circuits other than the memory core. The memory controller 110 may be a training subject to determine optimal parameters with respect to a memory core parameter and/or peripheral circuit parameters. According to embodiments, memory training may be performed by the memory device 120 that is a subject.

The memory controller 110 may include a first ZQ calibration circuit 112, and a first input/output (I/O) circuit 114. The memory controller 110 may also include a register control word (RCW) for controlling the memory device 120 in accordance with the initialization and/or operation characteristics of the memory device 120. The RCW may include various algorithms that configure the memory controller 110 so that the memory controller 110 may normally interoperate with the memory device 120. In an implementation, codes indicating frequency, timing, driving, and detailed operation parameters of the memory device 120 may be set in the RCW. The memory controller 110 may program the MRS of the memory device 120 by issuing a mode register write command. The MRS may be programmed to set a plurality of operation parameters, options, various functions, characteristics, and modes of the memory device 120, and may be programmed with the same parameter codes as the codes of the RCW. That is, the MRS may be programmed according to the codes of the RCW. The codes of the RCW may represent a burst length (BL), RL/WL, an SoC On Die Termination (ODT) function, a pull-down/ODT and pull-up/output high level voltage (Voh) calibration.

The first I/O circuit 114 of the memory controller 110 may transmit a clock signal, a command signal, an address signal, and/or data to the memory device 120 through the channel 130. Also, the first I/O circuit 114 may receive read data provided by the memory device 120 that has performed the read operation through the channel 130. The first ZQ calibration circuit 112 of the memory controller 110 may perform a ZQ calibration operation on signal lines through which the clock signal, the command signal, the address signal, and/or the data are transmitted. The ZQ calibration operation of the memory controller 110 is described in detail with reference to FIG. 2.

Meanwhile, the memory controller 110 may further include a memory physical interface (PHY) connected to the channel 130. The memory PHY may include a physical or electrical layer and a logical layer provided for signals, frequency, timing, driving, detailed operation parameters, and functionality required for efficient communication between the memory controller 110 and the memory device 120. The memory PHY may support features of DDR and/or LPDDR protocols of the Joint Electron Device Engineering Council (JEDEC) standard.

The memory device 120 may include a second ZQ calibration circuit 122 and a second I/O circuit 124. The second I/O circuit 124 may include a receiver that receives the clock signal, the command signal, the address signal, and/or the data transmitted through the channel 130 by the memory controller 110. Also, the second I/O circuit 124 may include a transmitter that transmits data read from the memory core to the memory controller 110 through the channel 130. The second ZQ calibration circuit 122 may perform the ZQ calibration operation of controlling the impedance of each of a plurality of signal pins of the memory device 120.

Figure 2:
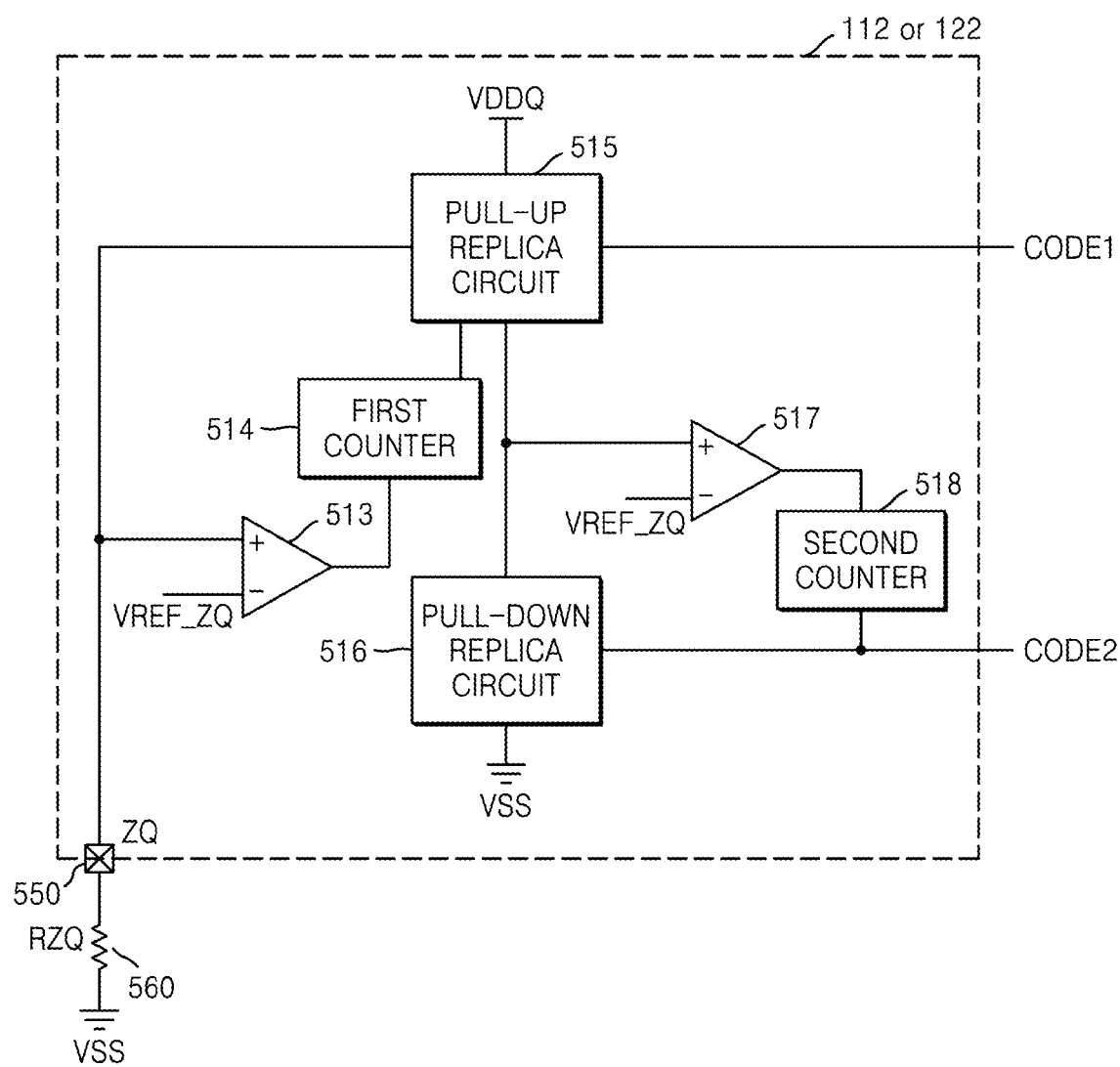
FIG. 2 is a block diagram showing an impedance adjustment calibration circuit according to an example embodiment.

FIG. 2 is a block diagram showing an impedance adjustment calibration circuit according to an example embodiment. The block diagram of FIG. 2 shows an example of the first ZQ calibration circuit 112 of the memory controller 110 of FIG. 1 or the second ZQ calibration circuit 122 of the memory device 120.

Figure 6:
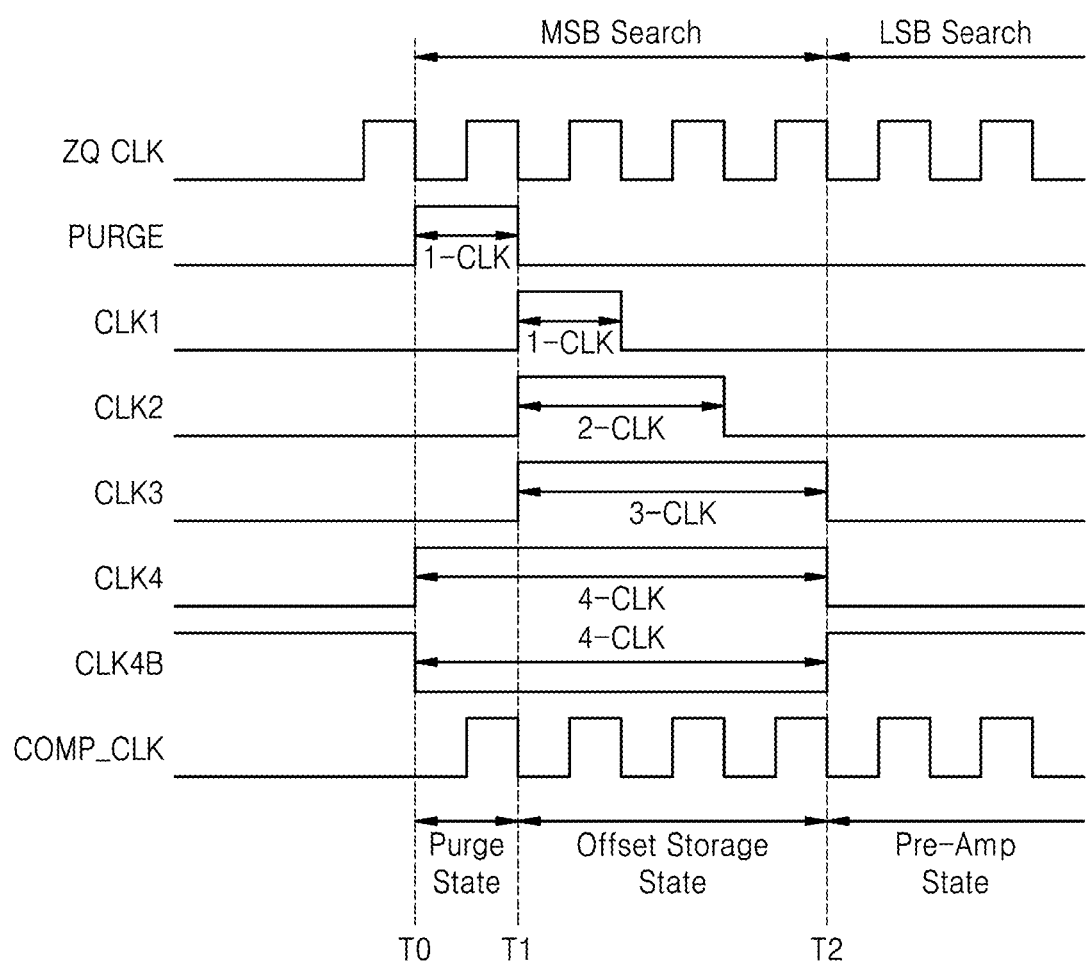
FIG. 6 is a timing diagram showing an operation of a data converter according to an example embodiment.

Referring to FIG. 2, the first ZQ calibration circuit 112 or the second ZQ calibration circuit 122 may include a first comparator 513, a first counter 514, a pull-up replica circuit 515, a pull-down replica circuit 516, a second comparator 517, and a second counter 518. The pull-up replica circuit 515 may have substantially the same configuration as a pull-up driver circuit 610 of FIG. 3, and the pull-down replica circuit 516 may have substantially the same configuration as a pull-down driver circuit 620 of FIG. 3. The first ZQ calibration circuit 112 or the second ZQ calibration circuit 122 may operate based on a ZQ clock signal ZQ CLK (FIG. 6).

The first comparator 513 may compare the voltage level of the line connected to a ZQ pin 550 with the level of a reference voltage VREF_ZQ, and generate an up/down signal based on a result of the comparison. In an implementation, the reference voltage VREF_ZQ may have a voltage level corresponding to half VDDQ/2 of the level of a power supply voltage VDDQ. The first counter 514 may be stepped up or down based on the up/down signal of the first comparator 513 to output a multi-bit count value, that is, a count code. The count code of the first counter 514 may be provided to the pull-up replica circuit 515. As the pull-up replica circuit 515 is swept by the count code, the voltage level of the line connected to the ZQ pin 550 may increase or decrease.

The first comparator 513 may perform a comparison operation until the result of comparison between the voltage level of the line connected to the ZQ pin 550 and the level of the reference voltage VREF_ZQ is the same or within a certain value. The first comparator 513 may perform a comparison operation until the first counter 514 enters a dither condition in which the first counter 514 oscillates between stepped up and down. When the result of comparison is the same or within a certain value and/or the first counter 514 reaches the dither condition, the count code of the first counter 514 may be provided as a first code signal CODE1 of the pull-up replica circuit 515. A pull-up termination resistor of the pull-up replica circuit 515 may be adjusted by the first code signal CODE1.

The pull-up replica circuit 515 may be connected to the pull-down replica circuit 516. The second comparator 517 may compare the voltage level of the connection node between the pull-up replica circuit 515 and the pull-down replica circuit 516 with the level of the reference voltage VREF_ZQ, and may generate the up/down signal based on a result of comparison. The second counter 518 may step up or down based on the up/down signal of the second comparator 517 to output a count code. The count code of the second counter 518 may be provided to the pull-down replica circuit 516, and the pull-down replica circuit 516 may be swept by the count code of the second counter 518.

Figure 3:
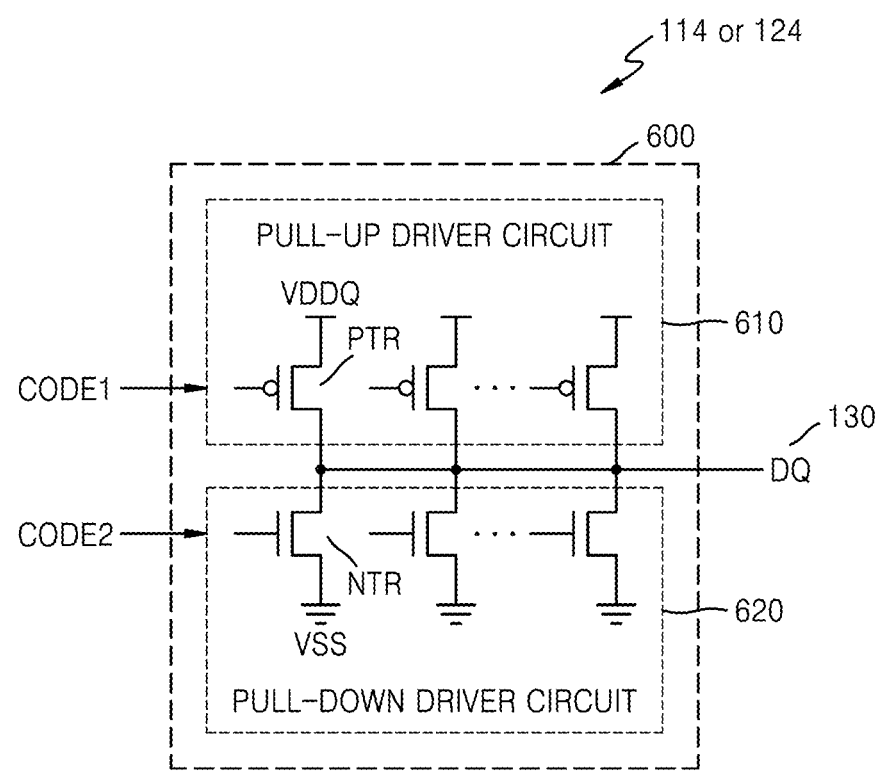
FIG. 3 is a circuit diagram showing an input/output circuit according to an example embodiment.

The pull-down replica circuit 516 may have substantially the same configuration as the pull-down circuit 620 of FIG. 3. The pull-down replica circuit 516 may perform a pull-down calibration operation until the voltage level of the connection node between the pull-up replica circuit 515 and the pull-down replica circuit 516 is the same as the level of the reference voltage VREF_ZQ by the second comparator 517 and the second counter 518. When the voltage level of the connection node between the pull-up replica circuit 515 and the pull-down replica circuit 516 is the same as the level of the reference voltage VREF_ZQ, the count code of the second counter 518 may be provided as a second code signal CODE2. A pull-down termination resistor of the pull-down replica circuit 516 may be adjusted by the second code signal CODE2.

FIG. 3 is a circuit diagram showing an input/output circuit according to an example embodiment. The circuit diagram of FIG. 3 shows the first I/O circuit 114 of the memory controller 110 of FIG. 1 or the second I/O circuit 124 of the memory device 120, and an example of an output driver circuit included in the first I/O circuit 114 or the second I/O circuit 124.

Referring to FIG. 3, the first I/O circuit 114 or the second I/O circuit 124 may include an output driver circuit 600 connected to the DQ line of the channel 130. The output driver circuit 600 may provide a termination resistor value of the DQ pin based on the first and second code signals CODE1 and CODE2 provided from the first ZQ calibration circuit 112 or the second ZQ calibration circuit 122. The output driver circuit 600 may include a pull-up driver circuit 610 connected between the power supply voltage VDDQ line and the DQ pin, and a pull-down driver circuit 620 connected between the DQ pin and a ground voltage VSS line.

The pull-up circuit 610 may include a plurality of PMOS transistors PTR connected between the power supply voltage VDDQ line and the DQ pin and arranged in parallel. Each of the plurality of PMOS transistors PTR may be turned on or off in response to the first code signal CODE1 of n bits corresponding thereto. According to an embodiment, size ratios of the plurality of PMOS transistors PTR related to transistor widths may be the same or different. A resistance value of each of the plurality of PMOS transistors PTR according to the on/off state according to the first code signal CODE1 may be provided as a pull-up termination resistor RU (FIG. 4) of the DQ pin.

The pull-down circuit 620 may include a plurality of NMOS transistors NTR connected between the DQ pin and the ground voltage VSS line and arranged in parallel. Each of the NMOS transistors NTR may be turned on or off in response to the second code signal CODE2 of n bits corresponding thereto. According to an embodiment, size ratios of the plurality of NMOS transistors NTR related to transistor widths may be the same or different. A resistance value of each of the plurality of NMOS transistors NTR according to the on/off state may be provided as a pull-down termination resistor RD (FIG. 4) of the DQ pin.

In FIG. 3, the pull-up circuit 610 includes PMOS transistors, and the pull-down circuit 620 includes NMOS transistors. As an example, each of the pull-up circuit 610 and the pull-down circuit 620 may include NMOS transistors or PMOS transistors. As another example, each of the pull-up circuit 610 and the pull-down circuit 620 may include both NMOS transistors and PMOS transistors in consideration of operation characteristics of transistors.

Meanwhile, the output driver circuit 600 included in the first I/O circuit 114 or the second I/O circuit 124 may transmit data DQ through the DQ pin. The first code signal CODE1 and the second code signal CODE2 for outputting a corresponding logic level of the data DQ to the DQ pin may be provided to the output driver circuit 600. The PMOS transistors PTR of the pull-up circuit 610 may be turned on or off in response to the first code signal CODE1. The PMOS transistors PTR corresponding to a bit value "0" of the first code signal CODE1 may be turned on so that the DQ pin may be driven to a logic high level. The NMOS transistors NTR of the pull-down circuit 620 may be turned on or off in response to the second code signal CODE2. NMOS transistors corresponding to a bit value "1" of the second code signal CODE2 may be turned on so that the DQ pin may be driven to a logic low level.

As described above, the first I/O circuit 114 or the second I/O circuit 124 may provide the pull-up termination resistor of the DQ pin based on the first code signal CODE1 and may provide the pull-down termination resistor of the DQ pin based on the second code signal CODE2. In consideration of the function of the first I/O circuit 114 or the second I/O circuit 124 to provide the ODT resistance of each of the memory controller 110 and the memory device 120, the first I/O circuit 114 or the second I/O circuit 124 may be referred to as the first ODT circuit 114 or the second ODT circuit 124.

Figure 4A:
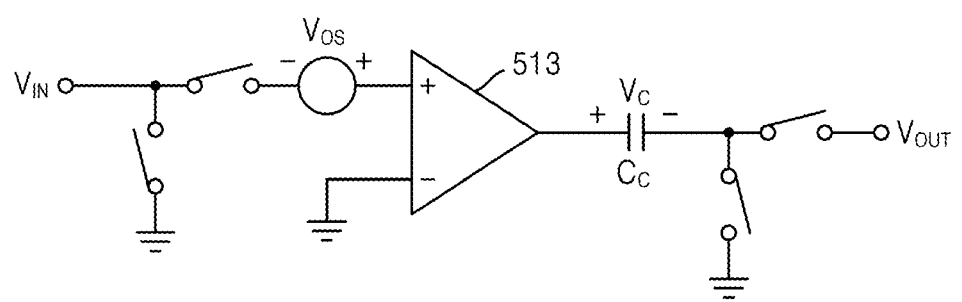
FIG. 4A is a circuit diagram showing a comparator generating an output voltage by comparing an offset voltage and a ground according to an example embodiment.
Figure 4B:
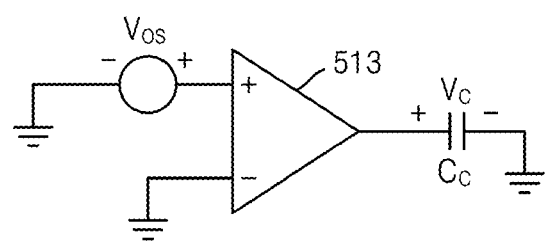
FIG. 4B is a circuit diagram showing a comparator storing an offset voltage in a first capacitor according to an example embodiment.
Figure 4C:
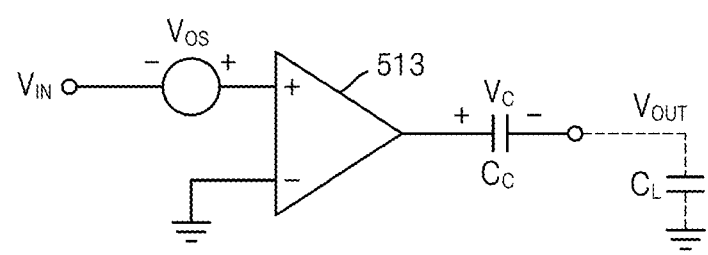
FIG. 4C is a circuit diagram showing a comparator including a second capacitor to reduce the gain of the comparator according to an example embodiment.
Figure 4D:
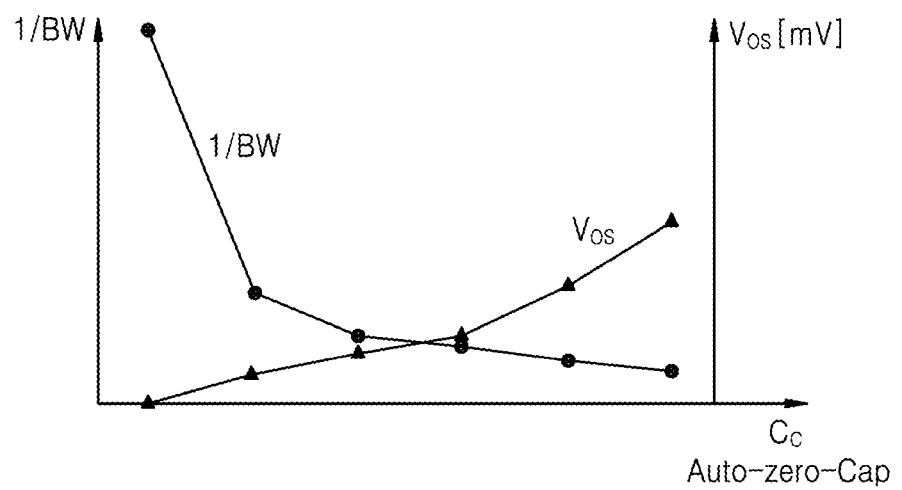
FIG. 4D is a graph showing a capacitance of a capacitor against the offset voltage and the operating speed of the comparator according to an example embodiment.

FIGS. 4A to 4D are diagrams illustrating the operation of the comparator 513 of FIG. 3. FIGS. 4A to 4C describe an offset voltage Vos of the comparator 513, and FIG. 4D is a graph illustrating the relationship between a capacitor used in an autozeroing (AZ) method and the offset voltage Vos. FIG. 4A is a circuit diagram showing a comparator generating an output voltage by comparing an offset voltage and a ground according to an example embodiment. FIG. 4B is a circuit diagram showing a comparator storing an offset voltage in a first capacitor according to an example embodiment. FIG. 4C is a circuit diagram showing a comparator including a second capacitor to reduce the gain of the comparator according to an example embodiment. FIG. is a graph showing a capacitance of a capacitor against the offset voltage and the operating speed of the comparator according to an example embodiment.

Referring to FIG. 4A, the comparator 513 may generate an output voltage VOUT by comparing voltages applied to a first input terminal (+) and a second input terminal (−). The comparator 513 may include the offset voltage Vos and may be modeled to provide the offset voltage Vos to the first input terminal (+). To describe the operation of the comparator 513 according to the offset voltage Vos, the comparator 513 may be modeled to include a capacitor Cc connected to the output of the comparator 513 and a plurality of switches connected to an input voltage VIN line and the output voltage VOUT line.

In the modeling of FIG. 4B, the offset voltage Vos may be stored in the capacitor Cc. A voltage Vc of both ends of the capacitor Cc may be expressed as Equation 1, and the output voltage VOUT may be expressed as Equation 2.

$$V_c = A \times V_{os} \quad \text{[Equation 1]}$$

$$V_{OUT} = A \times (V_{IN} + V_{OS}) - V_c = A \times (V_{IN} + V_{OS}) - A \times V_{os} = A \times V_{IN} \quad \text{[Equation 2]}$$

Here, A denotes a gain of the comparator 513.

When the operation of the comparator 513 reaches the speed limit, the offset voltage Vos may not be entirely stored in the capacitor Cc. Accordingly, the capacitance of the capacitor Cc may be important.

In the modeling of FIG. 4C, the gain of the comparator 513 may be reduced by $$\frac{C_L}{C_C + C_L},$$

due to the capacitance dividing by a capacitor $C_L$ connected to the output voltage VOUT line, so that voltage Vc of both ends of the capacitor CC and the output voltage VOUT may be expressed as Equations 3 and 4.

$$V_c = A \times V_{os}(1 - \frac{C_L}{C_C + C_L}) \qquad \text{[Equation 3]}$$

$$\begin{aligned}
V_{OUT} &= A \times (V_{IN} \frac{C_C}{C_C + C_L} + V_{OS}(1 - \frac{C_C}{C_C + C_L})) \qquad \text{[Equation 4]}\\
&= A \times (\frac{C_C}{C_C + C_L})(V_{IN} + V_{OS}\frac{C_C + C_L}{C_C}(1 - \frac{C_C}{C_C + C_L}))\\
&= A \times \frac{C_C}{C_C + C_L}(V_{IN} + V_{OS}(\frac{C_C + C_L}{C_C} - 1))\\
&= A \times \frac{C_C}{C_C + C_L}(V_{IN} + V_{OS}\frac{C_L}{C_C})
\end{aligned}$$

Equation 3 shows that a gain reduction may be small when the $C_C$ capacitance value is greater than a $C_L$ capacitance value, and the gain reduction may be large when the $C_C$ capacitance value is less than the $C_L$ capacitance value. Equation 4 shows that the $$V_{OS}\frac{C_L}{C_C}$$

voltage Vc stored in the capacitor $C_C$ is additionally generated by a voltage in $$V_{OS}\frac{C_L}{C_C}$$

relation to the capacitor $C_L$. The voltage may function as an offset error of the comparator 153. The offset error dominates the capacitor $C_C$, so it is important to ensure that the charge injection by multiple switches shown in FIG. 4A does not affect the capacitor $C_C$. A method of cancelling the offset voltage Vos using such a switched capacitor is the AZ method. When the capacitor $C_C$ is used in the AZ method, as shown in FIG. 4D, the capacitance of the capacitor $C_C$ may be determined considering the trade-off between characteristics in which as the capacitance of the capacitor $C_C$ increases, the operating speed (1/BW) of the comparator 513 slows down and the offset voltage Vos increases.

Figure 5:
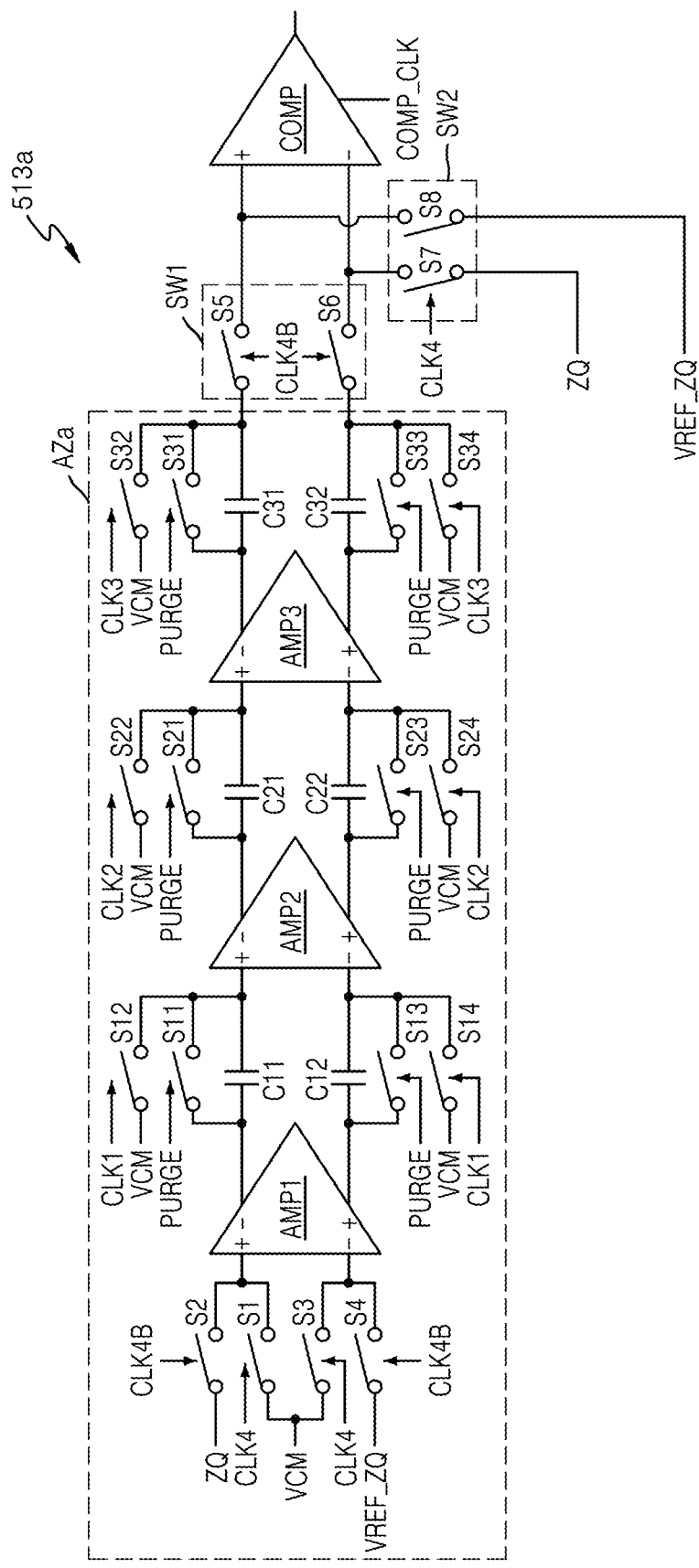
FIG. 5 is a circuit diagram showing a data converter including a comparator circuit connected to both a first autozeroing circuit via a first switch unit, and a ZQ pin and a reference voltage via a second switch unit according to an example embodiment.

FIG. 5 is a circuit diagram showing a data converter including a comparator circuit connected to both a first autozeroing circuit via a first switch unit, and a ZQ pin and a reference voltage via a second switch unit according to an example embodiment. A first data converter 513a of FIG. 5 may be included in the first ZQ calibration circuit 112 or the second ZQ calibration circuit 122 of FIG. 2 and is a circuit diagram illustrating an example of the first comparator 513 or the second comparator 517. For convenience of description, the first data converter 513a may be referred to as a comparator.

Referring to FIG. 5, the first data converter 513a may include a first autozeroing circuit AZa, a first switch unit SW1, a second switch unit SW2, and a comparator circuit COMP. The first autozeroing circuit AZa may include gain circuits including amplification circuits AMP1, AMP2, and AMP3, capacitors C11, C12, C21, C22, C31, and C32, and switches S1 to S4, S11 to S14, S21 to S24, and S31 to S34, and may have a structure in which the gain circuits are cascaded. The first autozeroing circuit AZa may cancel the offset voltage Vos of the first autozeroing circuit AZa from the capacitors C11, C12, C21, C22, C31, and C32 through the switches S1 to S4, S11 to S14, S21 to S24, and S31 to S34. That is, the first autozeroing circuit AZa may perform an operation of cancelling a switch feedthrough offset. In the present embodiment, the first autozeroing circuit AZa is described as including three amplification circuits AMP, but may include various numbers of amplification circuits AMP.

The amplification circuit AMP1 and the capacitors C11 and C12 may constitute a first gain circuit, the amplification circuit AMP2 and the capacitors C21 and C22 may constitute a second gain circuit, and the amplification circuit AMP3 and the capacitors C31 and C32 may constitute a third gain circuit. The amplification circuits AMP1, AMP2, and AMP3 may be implemented as fully differential amplification circuits. Assuming that the gains of the amplification circuits AMP1, AMP2, and AMP3 are respectively A1, A2, and A3, the total gain of the first autozeroing circuit AZa may be designed as A1·A2·A3.

The amplification circuit AMP1 may be connected to the switches S1 and S2 in the first input terminal (+) and may be connected to the switches S3 and S4 in the second input terminal (−). The switch S1 may be connected between the common voltage VCM line and the first input terminal (+) and turned on/off in response to a clock signal CLK4. The switch S2 may be connected between the ZQ pin (550 in FIG. 2) and the first input terminal (+) and turned on/off in response to a clock signal CLK4B. The clock signal CLK4 and clock signal CLK4B are complementary. Clock signals are complementary when a rising edge of a first clock signal is simultaneously with a falling edge of a second clock signal and when a rising edge of the second clock signal is simultaneously with a falling edge of the first clock signal. The switch S3 may be connected between the common voltage VCM line and the second input terminal (−) and may be turned on/off in response to the clock signal CLK4. The switch S4 may be connected between the reference voltage VREF_ZQ (FIG. 2) line and the second input terminal (−) and may be turned on/off in response to the clock signal CLK4B. According to an embodiment, the common voltage VCM may be set to a ground voltage VSS. The first output terminal (−) of the amplification circuit AMP1 may be connected to the capacitor C11, and the second output terminal (+) of the amplification circuit AMP1 may be connected to the capacitor C12.

The capacitor C11 may be connected between the first output terminal (−) of the amplification circuit AMP1 and the first input terminal (+) of the amplification circuit AMP2, and may be connected to the switches S11 and S12. The switch S11 may be connected between both ends of the capacitor C11 and turned on/off in response to a purge signal PURGE. The switch S12 may be connected between the common voltage VCM line and a connection node of the capacitor C11 and the amplification circuit AMP2 and turned on/off in response to the clock signal CLK1. The capacitor C12 may be connected between the second output terminal (+) of the amplification circuit AMP1 and the second input terminal (−) of the amplification circuit AMP2, and connected to the switches S13 and S14. The switch S13 may be connected between both ends of the capacitor C12 and turned on/off in response to the purge signal PURGE. The switch S14 may be connected between the common voltage VCM line and the connection node of the capacitor C12 and the amplification circuit AMP2 and turned on/off in response to the clock signal CLK1.

The first input terminal (+) of amplification circuit AMP2 may be connected to the capacitor C11 and the second input terminal (−) of amplification circuit AMP2 may be connected to the capacitor C12. The first output terminal (−) of the amplification circuit AMP2 may be connected to the capacitor C21, and the second output terminal (+) of the amplification circuit AMP2 may be connected to the capacitor C22.

The capacitor C21 may be connected between the first output terminal (−) of the amplification circuit AMP2 and the first input terminal (+) of the amplification circuit AMP3, and connected to the switches S21 and S22. The switch S21 may be connected between both ends of the capacitor C21 and turned on/off in response to the purge signal PURGE. The switch S22 may be connected between the common voltage VCM line and a connection node of the capacitor C21 and the amplification circuit AMP3 and turned on/off in response to the clock signal CLK2. The capacitor C22 may be connected between the second output terminal (+) of the amplification circuit AMP2 and the second input terminal (−) of the amplification circuit AMP3, and connected to the switches S23 and S24. The switch S23 may be connected between both ends of the capacitor C22 and turned on/off in response to the purge signal PURGE. The switch S24 may be connected between the common voltage VCM line and a connection node of the C22 capacitor and the amplification circuit AMP3 and turned on/off in response to the clock signal CLK2.

The amplification circuit AMP3 may be connected to the capacitor C21 in the first input terminal (+) and may be connected to the capacitor C22 in the second input terminal (−). The first output terminal (−) of the amplification circuit AMP3 may be connected to the capacitor C31, and the second output terminal (+) of the amplification circuit AMP3 may be connected to the capacitor C32.

The capacitor C31 may be connected between the first output terminal (−) of the amplification circuit AMP3 and the switch S5 of the first switch unit SW1, and connected to the switches S31 and S32. The switch S31 may be connected between both ends of the capacitor C31 and turned on/off in response to the purge signal PURGE. The switch S32 may be connected between the common voltage VCM line and a connection node of the capacitor C31 and the switch S5 and turned on/off in response to the clock signal CLK3. The capacitor C32 may be connected between the second output terminal (+) of the amplification circuit AMP3 and the switch S6 of the first switch unit SW1, and connected to the switches S33 and S34. The switch S33 may be connected between both ends of the capacitor C32 and turned on/off in response to the purge signal PURGE. The switch S34 may be connected between the common voltage VCM line and a connection node of the capacitor C32 and the switch S6 and turned on/off in response to the clock signal CLK2.

The above-described first autozeroing circuit AZa may be configured to store its offset voltage Vos in the capacitors C11, C12, C21, C22, C31, and C32 connected to the output terminals of the amplification circuits AMP1, AMP2, and AMP3 through the switches S1 to S4, S11 to S14, S21 to S24, and S31 to S34. The first autozeroing circuit AZa of the present embodiment may be referred to as an output series offset cancellation circuit. In some embodiments, the first autozeroing circuit AZa may be implemented as an input series offset cancellation circuit (FIG. 10) or a combined input and output series offset cancellation circuit (FIG. 11).

The first switch unit SW1 may include the switches S5 and S6 connecting the first autozeroing circuit AZa to the comparator circuit COMP. The switch S5 may be connected between the capacitor C31 and the first input terminal (+) of the comparator circuit COMP and turned on/off in response to the clock signal CLK4B. The switch S6 may be connected between the capacitor C32 and the second input terminal (−) of the comparator circuit COMP and turned on/off in response to the clock signal CLK4B.

The second switch unit SW2 may include the switches S7 and S8 connecting the ZQ pin and the reference voltage VREF_ZQ line to the comparator circuit COMP. The switch S7 may be connected between the ZQ pin and the first input terminal (+) of the comparator circuit COMP and turned on/off in response to the clock signal CLK4. The switch S8 may be connected between the reference voltage VREF_ZQ line and the second input terminal (−) of the comparator circuit COMP and turned on/off in response to the clock signal CLK4.

The comparator circuit COMP may be selectively connected to the first switch unit SW1 and the second switch unit SW2. The comparator circuit COMP may compare the voltage level of the ZQ pin combined with the offset voltage Vos of the first autozeroing circuit AZa provided through the first switch unit SW1 and the level of the reference voltage VREF_ZQ. The comparator circuit COMP may compare the voltage level of the ZQ pin provided through the second switch unit SW2 with the level of the reference voltage VREF_ZQ. The comparator circuit COMP may generate an up/down signal based on a result of comparison, and the first counter 514 (FIG. 2) may be stepped up or down based on the up/down signal of the comparator circuit COMP and output a count code.

Figure 7A:
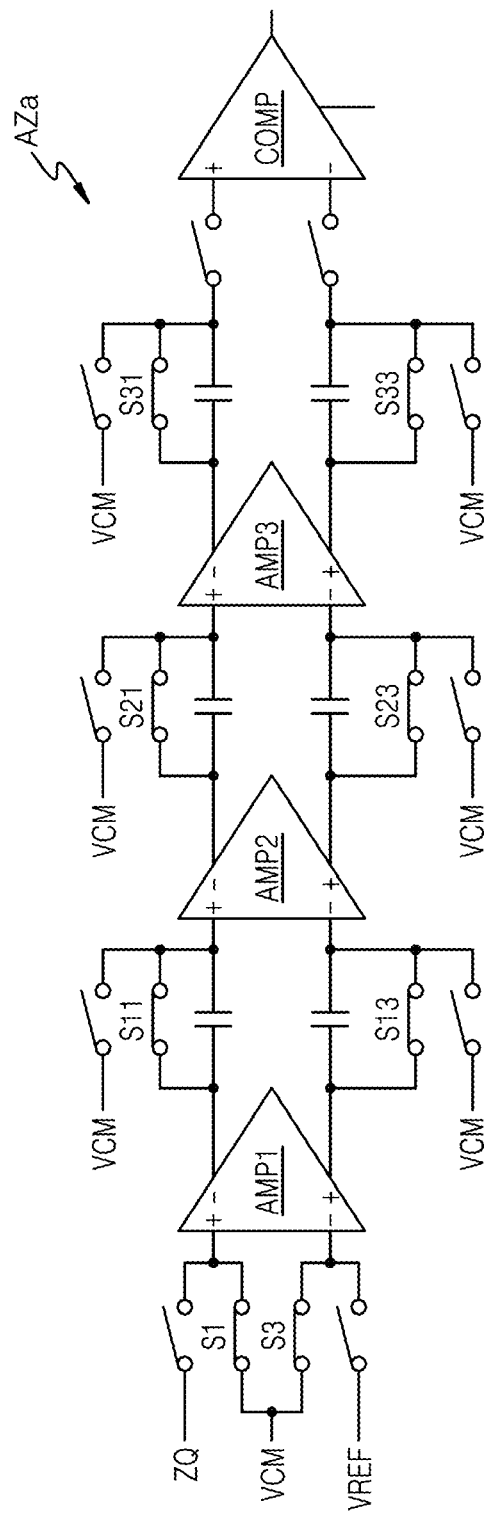
FIGS. 7A-7C are circuit diagrams showing the switch operation of an autozeroing circuit according to an example embodiment.
Figure 7B:
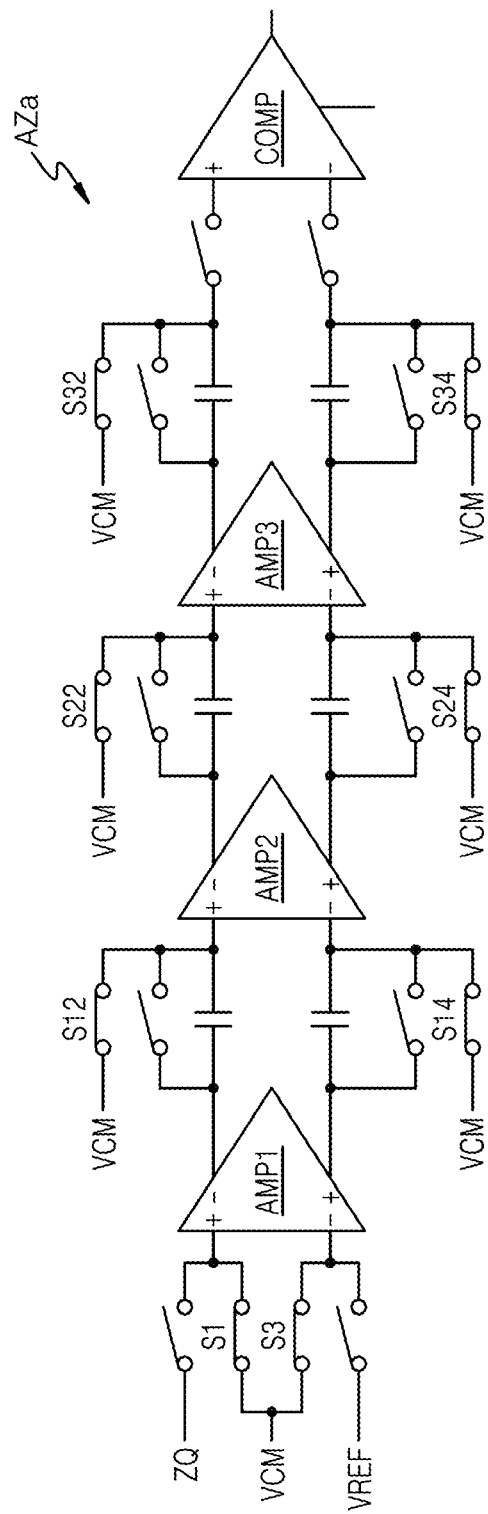
Figure 7C:
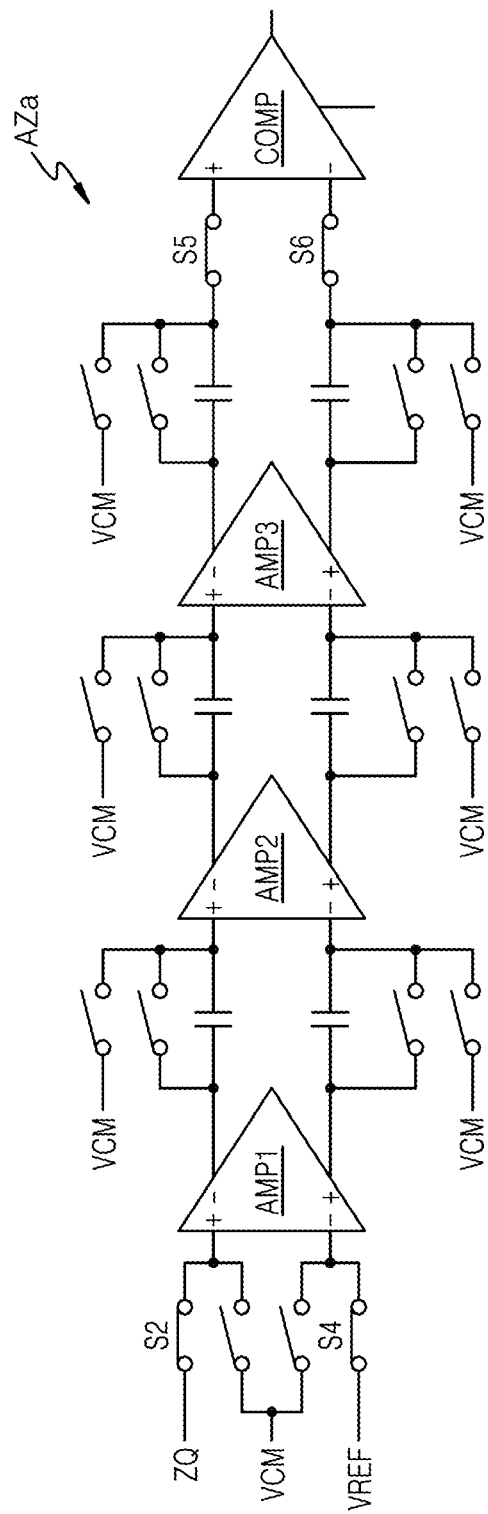

FIGS. 6 and 7a to 7c are diagrams illustrating the operation of a data converter of FIG. 5. FIG. 6 is a timing diagram showing an operation of a data converter according to an example embodiment. FIGS. 7A to 7C are circuit diagrams showing the switch operation of an autozeroing circuit according to an example embodiment. In the timing diagrams described below, the horizontal and vertical axes represent time and voltage levels, respectively, and are not necessarily drawn to scale.

Referring to FIGS. 5, 6, and 7A, the first data converter 513a may operate based on the ZQ clock signal ZQ CLK provided to the first ZQ calibration circuit 112 or the second ZQ calibration circuit 122. During one clock cycle 1CLK from a time T0 to a time T1, the purge signal PURGE may be provided at a logic high level. Accordingly, the switches S11, S13, S21, S23, S31, and S33 may be turned on to enter a purge state in which charges of the capacitors C11, C12, C21, C22, C31, and C32 are cancelled. The clock signal CLK4 may be provided at a logic high level, and the switches S1 and S3 may be turned on so that the common voltage VCM line is connected to input terminals of the amplification circuit AMP1, which may result in an offset voltage Vos of the amplification circuit AMP1. In response to the logic high level clock signal CLK4, the switches S7 and S8 of the second switch unit SW2 may be turned on so that the comparator circuit COMP may compare the voltage level of the ZQ pin with the level of the reference voltage VREF_ZQ. The comparator circuit COMP may generate an up/down signal based on the result of comparison, and the first counter 514 (FIG. 2) may be stepped up or down based on the up/down signal of the comparator circuit COMP to output a coarse count code. The operation of the comparator circuit COMP at this time may be referred to as a coarse search operation or an MSB search operation. The clock signal CLK4B may be provided at a logic low level, and switches S5 and S6 of the first switch unit SW1 may be turned off so that the first autozeroing circuit AZa may be disconnected from the comparator circuit COMP.

Referring to FIGS. 5, 6, and 7B, from the time T1 to a time T2, each of the clock signals CLK1, CLK2, and CLK3 may be provided at a logic high level, and the switches S12, S14, S22, S24, S32, and S34 may be turned on so that each of the capacitors C11, C12, C21, C22, C31, and C32 may store the offset voltage Vos correlated with the common voltage VCM. Thereafter, each of the clock signals CLK1, CLK2, and CLK3 may be sequentially provided at a logic low level. The clock signal CLK1 may be at a logic high level for the one clock cycle 1CLK, the clock signal CLK2 may be at a logic high level for 2 clock cycles 2CLK, and the clock signal CLK3 may be at a logic high level for 3 clock cycles 3CLK. Accordingly, the capacitors C11 and C12 may store the offset voltage Vos1 of the amplification circuit AMP1. The capacitors C21 and C22 may store an offset voltage Vos2/A1 attenuated by a gain A1 of the amplification circuit AMP1 from an offset voltage Vos2 of the amplification circuit AMP2. The capacitors C31 and C32 may store an offset voltage Vos3/(A1·A2) attenuated by gains A1 and A2 of the amplification circuit AMP1 and amplification circuit AMP2. Accordingly, from the time T1 to the time T2, the first autozeroing circuit AZa may operate in an offset storage state. At this time, the first autozeroing circuit AZa may be disconnected from the comparator circuit COMP by the clock signal CLK4B of logic low level, and the comparator circuit COMP may perform a coarse search operation or an MSB search operation in response to the clock signal CLK4 of logic high level.

Referring to FIGS. 5, 6, and 7C, at a time T3, the clock signal CLK4 may be provided at a logic low level and the clock signal CLK4B may be provided at a logic high level. The comparator circuit COMP may be disconnected from the ZQ pin and the reference voltage VREF_ZQ line by the off switches S7 and S8, and connected to the first autozeroing circuit AZa by the switches S5 and S6 which are turned on. In the first autozeroing circuit AZa, the switches S2 and S4 may be turned on by the clock signal CLK4B of logic high level, so that the ZQ pin and the reference voltage VREF_ZQ line may be connected to input terminals of the amplification circuit AMP1. The comparator circuit COMP may compare the voltage level of the ZQ pin combined with the offset voltage Vos stored in the capacitors C11, C12, C21, C22, C31, and C32 of the first autozeroing circuit AZa with the level of the reference voltage VREF_ZQ. The comparator circuit COMP may generate an up/down signal based on the result of comparison, and the first counter 514 (FIG. 2) may be stepped up or down based on the up/down signal of the comparator circuit COMP to output a fine count code. The operation of the comparator circuit COMP at this time may be referred to as a fine search operation, a full search operation, or an LSB search operation. The full search operation means that a coarse search operation may be performed during a fine search operation and the fine search operation may be performed again.

Figure 8A:
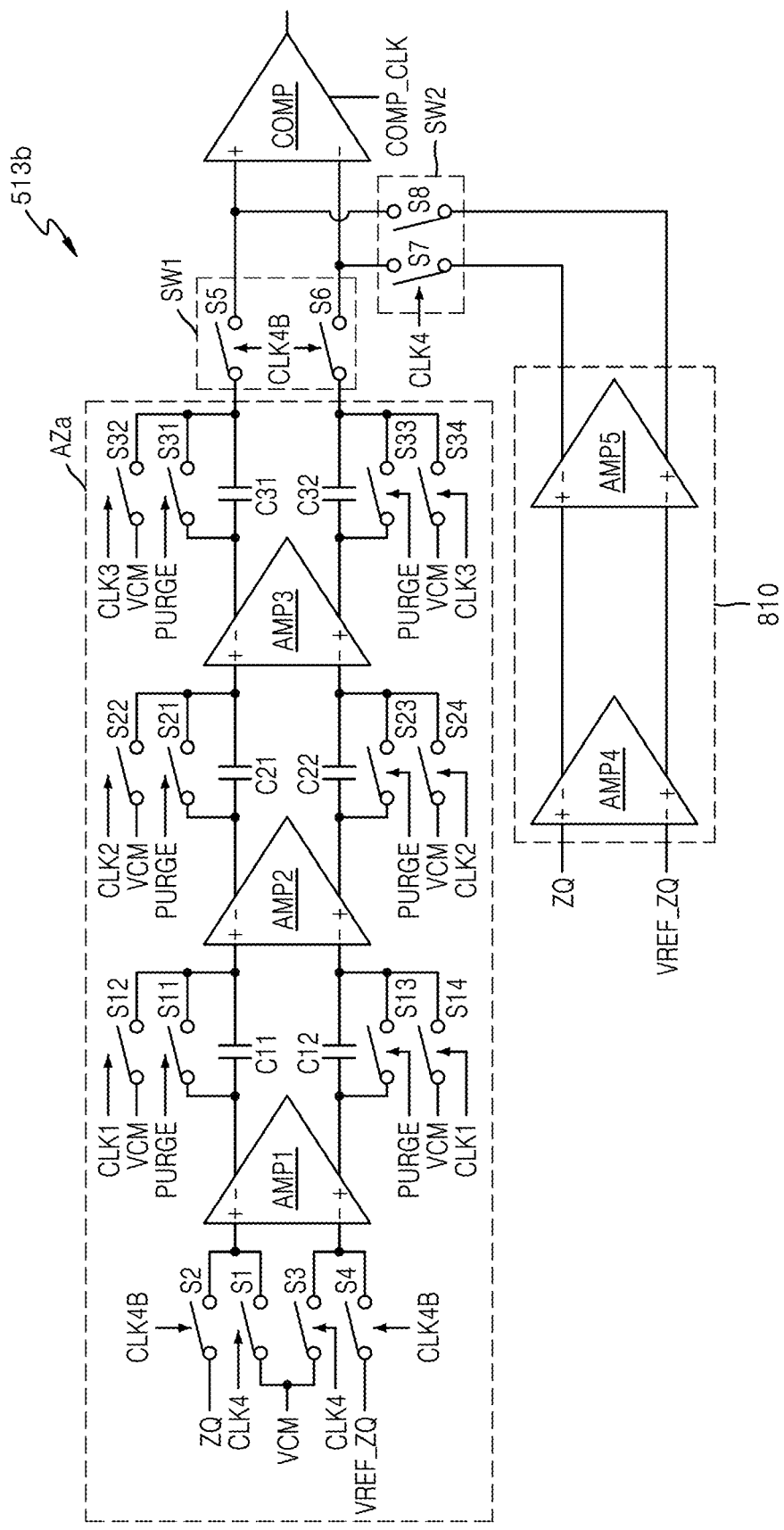
FIG. 8A is a circuit diagram showing a data converter including a first amplification circuit unit connected to a comparator circuit via a second switch unit according to an example embodiment.
Figure 8B:
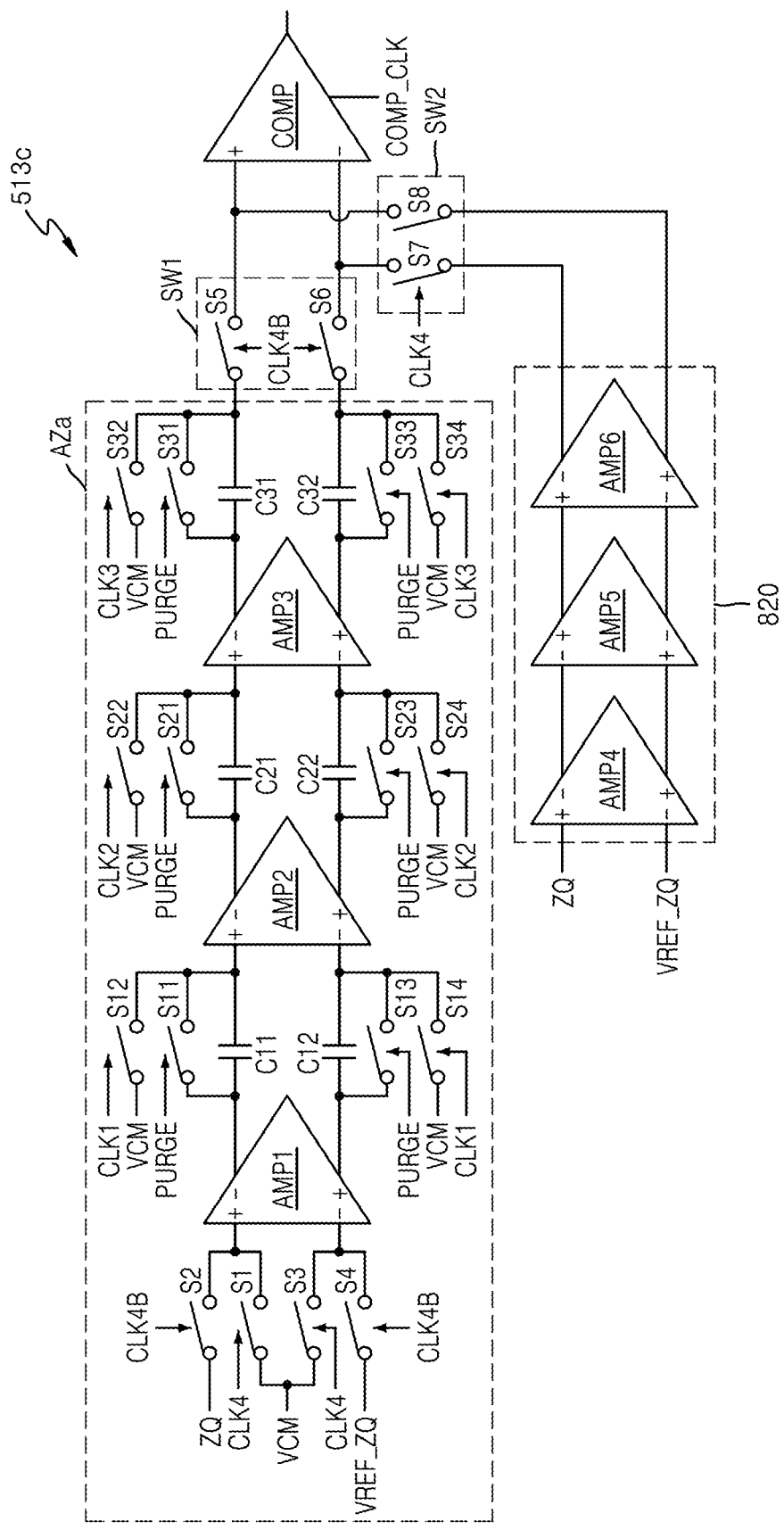
FIG. 8B is a circuit diagram showing a data converter including a second amplification circuit unit connected to a comparator circuit via a second switch unit according to an example embodiment.

FIG. 8A is a circuit diagram showing a data converter including a first amplification circuit unit connected to a comparator circuit via a second switch unit according to an example embodiment. FIG. 8B is a circuit diagram showing a data converter including a second amplification circuit unit connected to a comparator circuit via a second switch unit according to an example embodiment. Second and third data converters 513b and 513c of FIGS. 8A and 8B are different from the first data converter 513a of FIG. 5 in that the second and third data converters 513b and 513c further include first and second amplification circuit units 810 and 820 connected to the second switch unit SW2. Hereinafter, redundant descriptions of the second and third data converters 513b and 513c with that of the first data converter 513a are omitted.

The second data converter 513b of FIG. 8A may include a first amplification circuit unit 810 connected between the ZQ pin and the reference voltage VREF_ZQ line and the second switch unit SW2. The first amplification circuit unit 810 may include amplification circuits AMP4 and AMP5. The amplification circuit AMP4 may be connected to the ZQ pin in the first input terminal (+) and may be connected to the reference voltage VREF_ZQ line in the second input terminal (−). The first output terminal (−) of the amplification circuit AMP4 may be connected to the first input terminal (+) of the amplification circuit AMP5, and the second output terminal (+) of the amplification circuit AMP4 may be connected to the second input terminal (−) of the amplification circuit AMP5. The first output terminal (−) of the amplification circuit AMP5 may be connected to the switch S7 of the second switch unit SW2, and the second output terminal (+) of the amplification circuit AMP5 may be connected to the switch S8 of the second switch unit SW2. Although the first amplification circuit unit 810 is described as including two amplification circuits AMP4 and AMP5 in the present embodiment, various even numbers of amplification circuits AMP may be included.

The third data converter 513c of FIG. 8B may include a second amplification circuit unit 820 connected between the ZQ pin and the reference voltage VREF_ZQ line and the second switch unit SW2. The second amplification circuit unit 820 may include amplification circuits AMP4, AMP5, and AMP6. The amplification circuit AMP4 may be connected to the ZQ pin in the first input terminal (+) and may be connected to the reference voltage VREF_ZQ line in the second input terminal (−). The first output terminal (−) of the amplification circuit AMP4 may be connected to the second input terminal (−) of the amplification circuit AMP5, and the second output terminal (+) of the amplification circuit AMP4 may be connected to the first input terminal (+) of the amplification circuit AMP5. The second output terminal (+) of the amplification circuit AMP5 circuit may be connected to the first input terminal (+) of the amplification circuit AMP6, and the first output terminal (−) of the amplification circuit AMP5 circuit may be connected to the second input terminal (−) of the amplification circuit AMP6. The first output terminal (−) of the amplification circuit AMP6 may be connected to the switch S7 of the second switch unit SW2, and the second output terminal (+) of the amplification circuit AMP6 may be connected to the switch S8 of the second switch unit SW2. In the present embodiment, the second amplification circuit unit 820 is described as including three amplification circuits AMP4, AMP5, and AMP6, but various odd number amplification circuits AMP may be included.

Figure 9A:
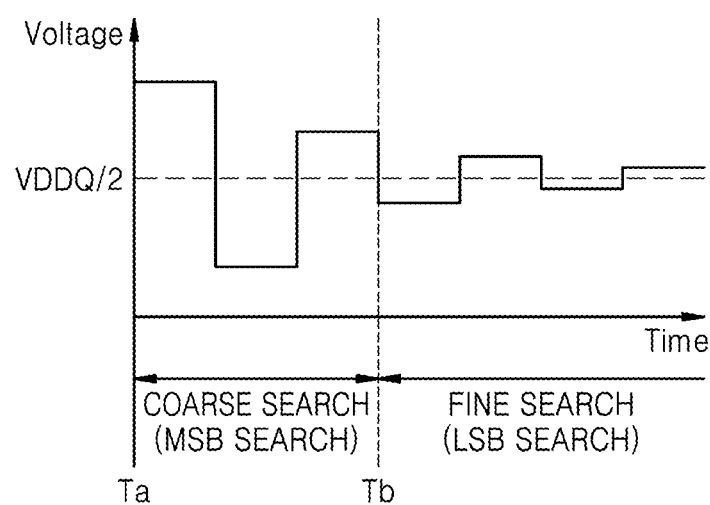
FIGS. 9A to 9C are diagrams showing a ZQ calibration operation of a data converter according to example embodiments.
Figure 9B:
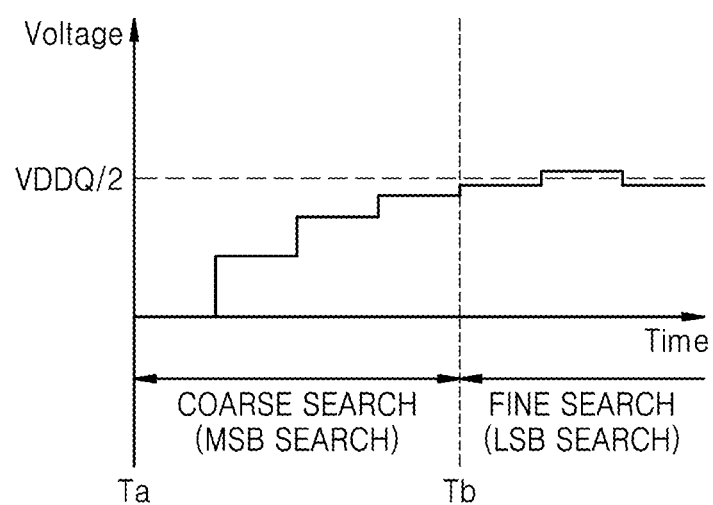
Figure 9C:
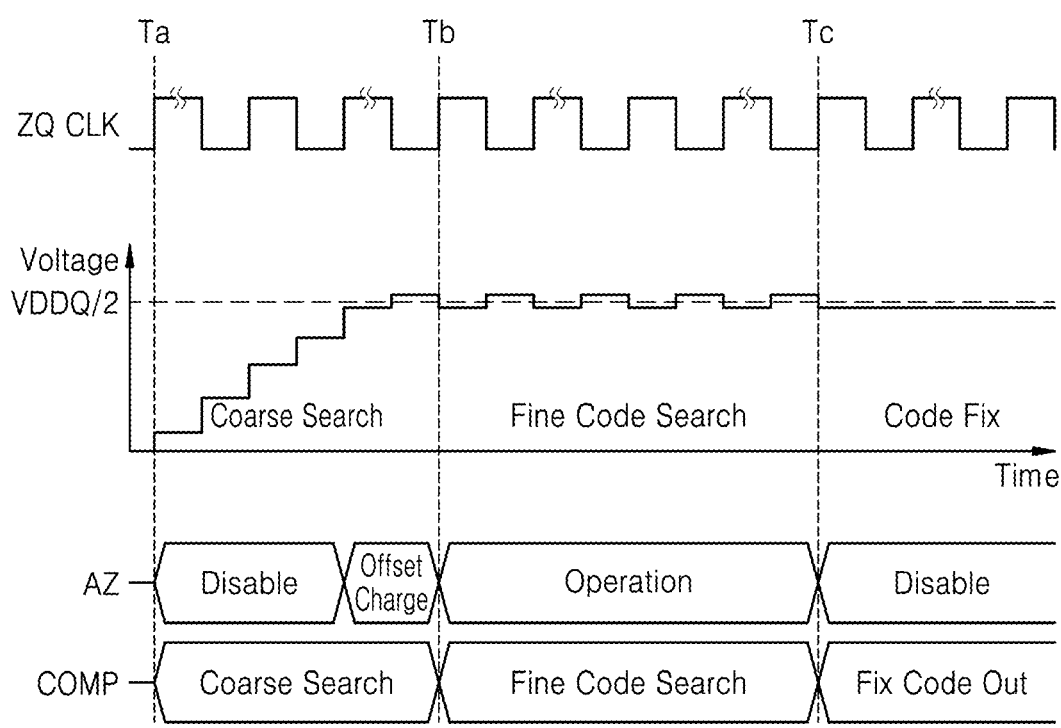

FIGS. 9A to 9C are diagrams showing a ZQ calibration operation of a data converter according to example embodiments. FIGS. 9A to 9C illustrate operations of the first ZQ calibration circuit 112 or the second ZQ calibration circuit 122 including the first data converter 513a in conjunction with FIGS. 2 and 5.

FIG. 9A shows that the first ZQ calibration circuit 112 or the second ZQ calibration circuit 122 generates code signals CODE1 and CODE2 by using a successive approximation register (SAR) search. FIG. 9B shows that the first ZQ calibration circuit 112 or the second ZQ calibration circuit 122 generates the code signals CODE1 and CODE2 by using a linear search. Referring to FIGS. 9A to 9C, it may be seen that a coarse search operation or an MSB search operation is performed from a time point Ta to a time point Tb, and a fine search operation or an LSB search operation is performed from the time point Tb.

During the coarse search operation, when the comparator circuit COMP of the first data converter 513a performs the coarse search operation and outputs the coarse code signals CODE1 and CODE2, the first autozeroing circuit AZa may perform an offset voltage Vos storage operation in parallel. During the fine search from the time Tb to the time Tc, the comparator circuit COMP may compare the voltage level of the ZQ pin combined with the offset voltage Vos stored in the first autozeroing circuit AZa and the level of the reference voltage VREF_ZQ to output the fine code signals CODE1 and CODE2. When the fine code signals CODE1 and CODE2 reach a dither condition in which the fine code signals CODE1 and CODE2 oscillate between stepped up and stepped down, the first data converter 513a may fix the fine code signals CODE1 and CODE2.

Figure 10:
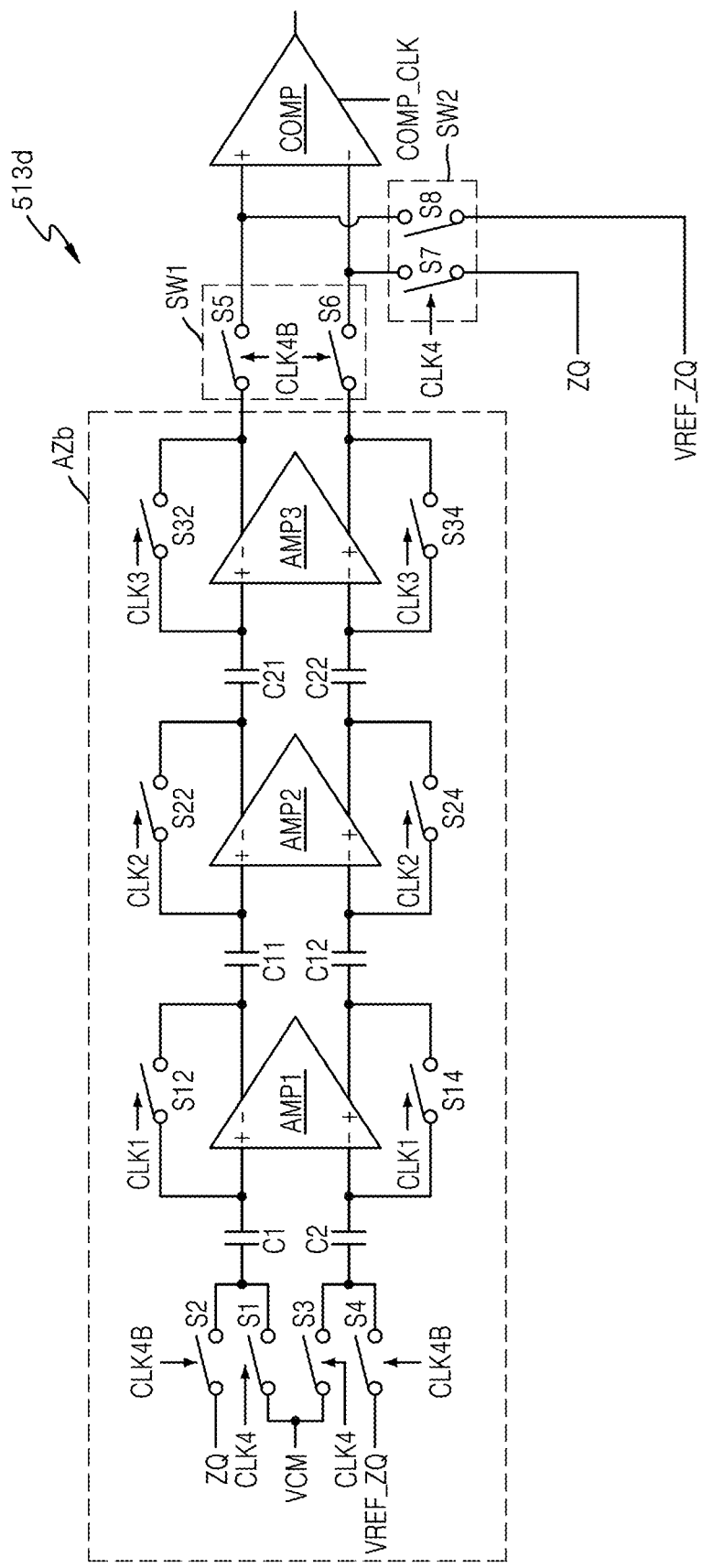
FIG. 10 is a circuit diagram showing a data converter including a comparator circuit connected to both a second autozeroing circuit via a first switch unit, and a ZQ pin and a reference voltage via a second switch unit according to an example embodiment.
Figure 11:
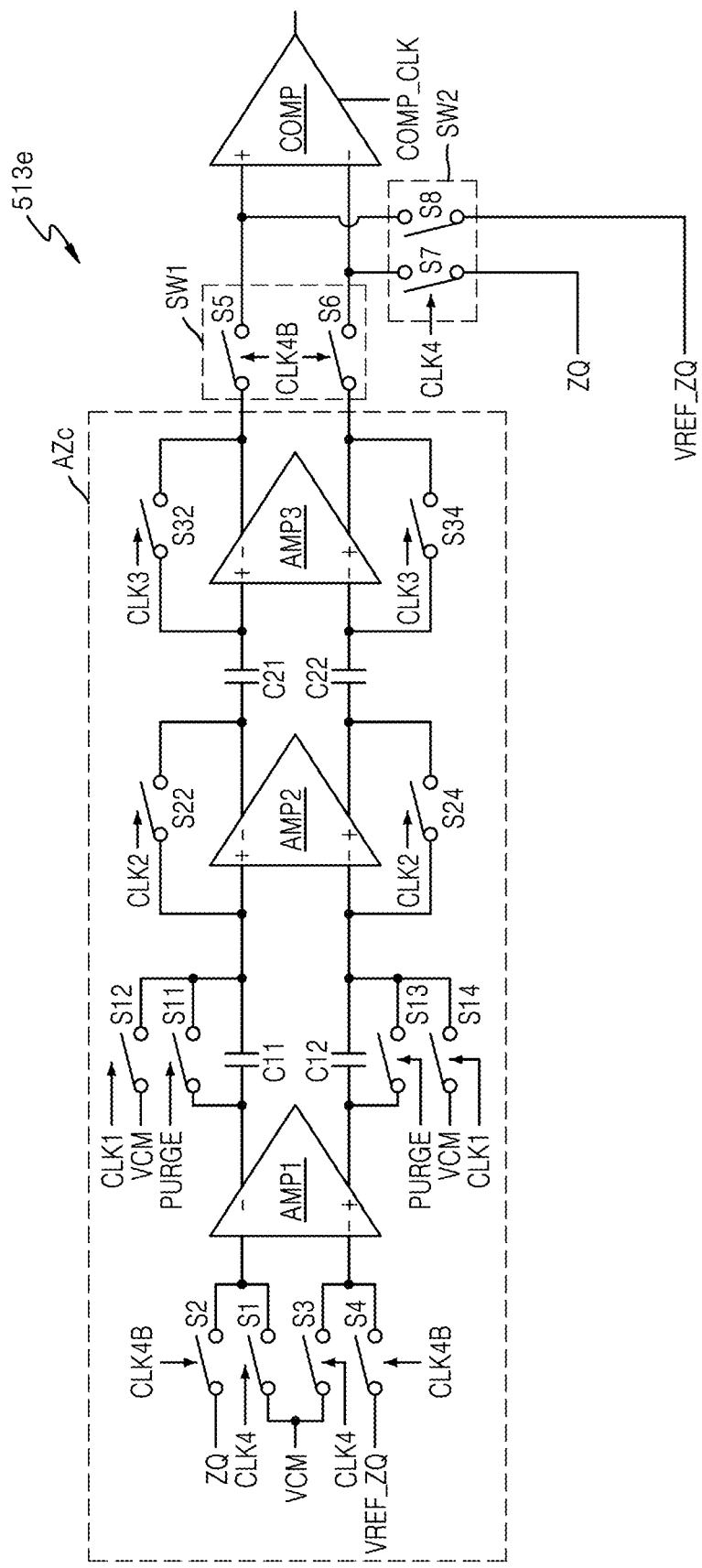
FIG. 11 is a circuit diagram showing a data converter including a comparator circuit connected to both a third autozeroing circuit via a first switch unit, and a ZQ pin and a reference voltage via a second switch unit according to an example embodiment.

FIG. 10 is a circuit diagram showing a data converter including a comparator circuit connected to both a second autozeroing circuit via a first switch unit, and a ZQ pin and a reference voltage via a second switch unit according to an example embodiment. FIG. 11 is a circuit diagram showing a data converter including a comparator circuit connected to both a third autozeroing circuit via a first switch unit, and a ZQ pin and a reference voltage via a second switch unit according to an example embodiment.

Referring to FIG. 10, a fourth data converter 513d may include an input series offset cancellation circuit. The fourth data converter 513d is different from the first data converter 513a in FIG. 5 in the configuration of a second autozeroing circuit AZb. The second autozeroing circuit AZb may include amplification circuits AMP1, AMP2, and AMP3, the capacitors C1, C2, C11, C12, C21, and C22, and the switches S1 to S4, S12, S14, S22, S24, and S31 to S34. The second autozeroing circuit AZb may cancel the offset voltage Vos of the second autozeroing circuit AZb from the capacitors C1, C2, C11, C12, C21, and C22 through the switches S1 to S4, S12, S14, S22, S24, and S31 to S34.

The capacitor C1 may be connected between the switches S1 and S2 and the first input terminal (+) of the amplification circuit AMP1, and the capacitor C2 may be connected between the switches S3 and S4 and the second input terminal (−) of the amplification circuit AMP1. The amplification circuit AMP1 may be connected between the capacitors C1 and C2 and the capacitors C11 and C12. The switch S12 may be connected between the first input terminal (+) of the amplification circuit AMP1 and the first output terminal (−) of the amplification circuit AMP1 and turned on/off in response to the clock signal CLK1. The switch S14 may be connected between the second input terminal (−) of the amplification circuit AMP1 and the second output terminal (+) of the amplification circuit AMP1 and turned on/off in response to the clock signal CLK1.

The capacitor C11 may be connected between the first output terminal (−) of the amplification circuit AMP1 and the first input terminal (+) of the amplification circuit AMP2 and connected to the switches S12 and S22. The capacitor C12 may be connected between the second output terminal (+) of the amplification circuit AMP1 and the second input terminal (−) of the amplification circuit AMP2 and connected to the switches S14 and S24. The amplification circuit AMP2 may be connected between the capacitors C11 and C12 and the capacitors C21 and C22. The switch S22 may be connected between the first input terminal (+) of the amplification circuit AMP2 and the first output terminal (−) of the amplification circuit AMP2 and turned on/off in response to the clock signal CLK2. The switch S24 may be connected between the second input terminal (−) of the amplification circuit AMP2 and the second output terminal (+) of the amplification circuit AMP2 and turned on/off in response to the clock signal CLK2.

The capacitor C21 may be connected between the first output terminal (−) of the amplification circuit AMP3 and the first input terminal (+) of the amplification circuit AMP3 and connected to the switches S22 and S32. The capacitor C22 may be connected between the second output terminal (+) of the amplification circuit AMP2 and the second input terminal (−) of the amplification circuit AMP3 and connected to the switches S24 and S34. The amplification circuit AMP3 may be connected between the capacitors C21 and C22 and the first switch unit SW1. The switch S32 may be connected between the first input terminal (+) of the amplification circuit AMP3 and the first output terminal (−) of the amplification circuit AMP3 and turned on/off in response to the clock signal CLK3. The switch S34 may be connected between the second input terminal (−) of the amplification circuit AMP3 and the second output terminal (+) of the amplification circuit AMP3 and turned on/off in response to the clock signal CLK3.

A fifth data converter 513e of FIG. 11 may include a combined input and output series offset cancellation circuit. The fifth data converter 513e is different from the first data converter 513a in FIG. 5 and the fourth data converter 513d in FIG. 10 in the configuration of a third autozeroing circuit AZc. The third autozeroing circuit AZc may include the amplification circuits AMP1, AMP2, and AMP3, the capacitors C11, C12, C21, and C22, and the switches S11 to S14, S22, S24, and S31 to S34. The third autozeroing circuit AZc may cancel the offset voltage Vos of the third autozeroing circuit AZc from the capacitors C1, C2, C11, C12, C21, and C22 through the switches S11 to S14, S22, S24, and S31 to S34.

The amplification circuit AMP1 may be connected to the switches S1 and S2 in the first input terminal (+) and may be connected to the switches S3 and S4 in the second input terminal (−). The switch S1 may be connected between the common voltage VCM line and the first input terminal (+) and turned on/off in response to the clock signal CLK4. The switch S2 may be connected between the ZQ pin and the first input terminal (+) and turned on/off in response to the clock signal CLK4B. The switch S3 may be connected between the common voltage VCM line and the second input terminal (−) and turned on/off in response to the clock signal CLK4. The switch S4 may be connected between the reference voltage VREF_ZQ line and the second input terminal (−) and turned on/off in response to the clock signal CLK4B. The first output terminal (−) of the amplification circuit AMP1 may be connected to the capacitor C11, and the second output terminal (+) of the amplification circuit AMP1 may be connected to the capacitor C12.

The capacitor C11 may be connected between the first output terminal (−) of the amplification circuit AMP1 and the first input terminal (+) of the amplification circuit AMP2, and may be connected to the switches S11 and S12. The switch S11 may be connected between both ends of the C11 capacitor and turned on/off in response to the purge signal PURGE. The switch S12 may be connected between the common voltage VCM line and the connection node of the C11 capacitor and the amplification circuit AMP2 and e turned on/off in response to the clock signal CLK1. The capacitor C12 may be connected between the second output terminal (+) of the amplification circuit AMP1 and the second input terminal (−) of the amplification circuit AMP2, and connected to the switches S13 and S14. The switch S13 may be connected between both ends of the capacitor C12 and turned on/off in response to the purge signal PURGE. The switch S14 may be connected between the common voltage VCM line and the connection node of the C12 capacitor and the amplification circuit AMP2 and turned on/off in response to the clock signal CLK1.

The amplification circuit AMP2 may be connected between the capacitors C11 and C12 and the capacitors C21 and C22. The switch S22 may be connected between the first input terminal (+) of the amplification circuit AMP2 and the first output terminal (−) of the amplification circuit AMP2 and on/off in response to the clock signal CLK2. The switch S24 may be connected between the second input terminal (−) of the amplification circuit AMP2 and the second output terminal (+) of the amplification circuit AMP2 and turned on/off in response to the clock signal CLK2.

The capacitor C21 may be connected between the first output terminal (−) of the amplification circuit AMP3 and the first input terminal (+) of the amplification circuit AMP3, and may be connected to the switches S22 and S32. The capacitor C22 may be connected between the second output terminal (+) of the amplification circuit AMP2 and the second input terminal (−) of the amplification circuit AMP3, and may be connected to the switches S24 and S34. The amplification circuit AMP3 may be connected between the capacitors C21 and C22 and the first switch unit SW1. The switch S32 may be connected between the first input terminal (+) of the amplification circuit AMP3 and the first output terminal (−) of the amplification circuit AMP3 and on/off in response to the clock signal CLK3. The switch S34 may be connected between the second input terminal (−) of the amplification circuit AMP3 and the second output terminal (+) of the amplification circuit AMP3 and turned on/off in response to the clock signal CLK3.

The fourth data converter 513d of FIG. 10 and the fifth data converter 513e of FIG. 11 may operate according to the timing diagram of FIG. 6, and perform a coarse code search operation, a fine code search operation, and a code fix operation associated with the ZQ calibration operation as shown in FIG. 9C.

Figure 12:
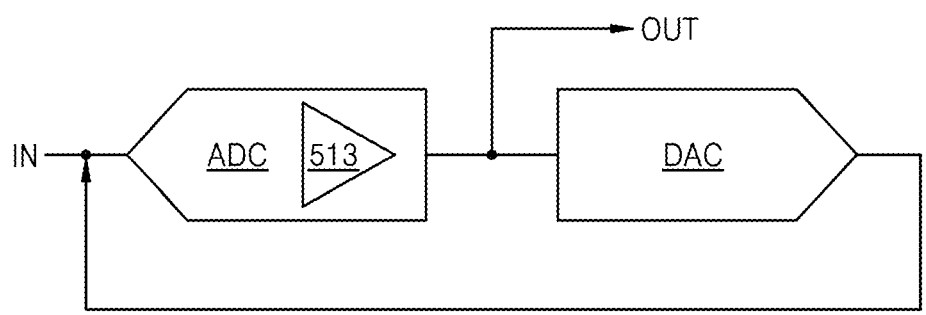
FIG. 12 is a diagram showing a data converter included in an analog digital converter circuit and connected to a digital analog converter circuit according to an example embodiment.

FIG. 12 is a diagram showing a data converter included in an analog digital converter circuit and connected to a digital analog converter circuit according to an example embodiment. Referring to FIG. 12, the data converter 513 may be included in an analog digital converter (ADC) circuit that receives an input signal IN, and an output signal OUT of the ADC circuit may be input to a digital analog converter (DAC) circuit. The output of the DAC circuit may be fed back to the input signal IN line.

Figure 13:
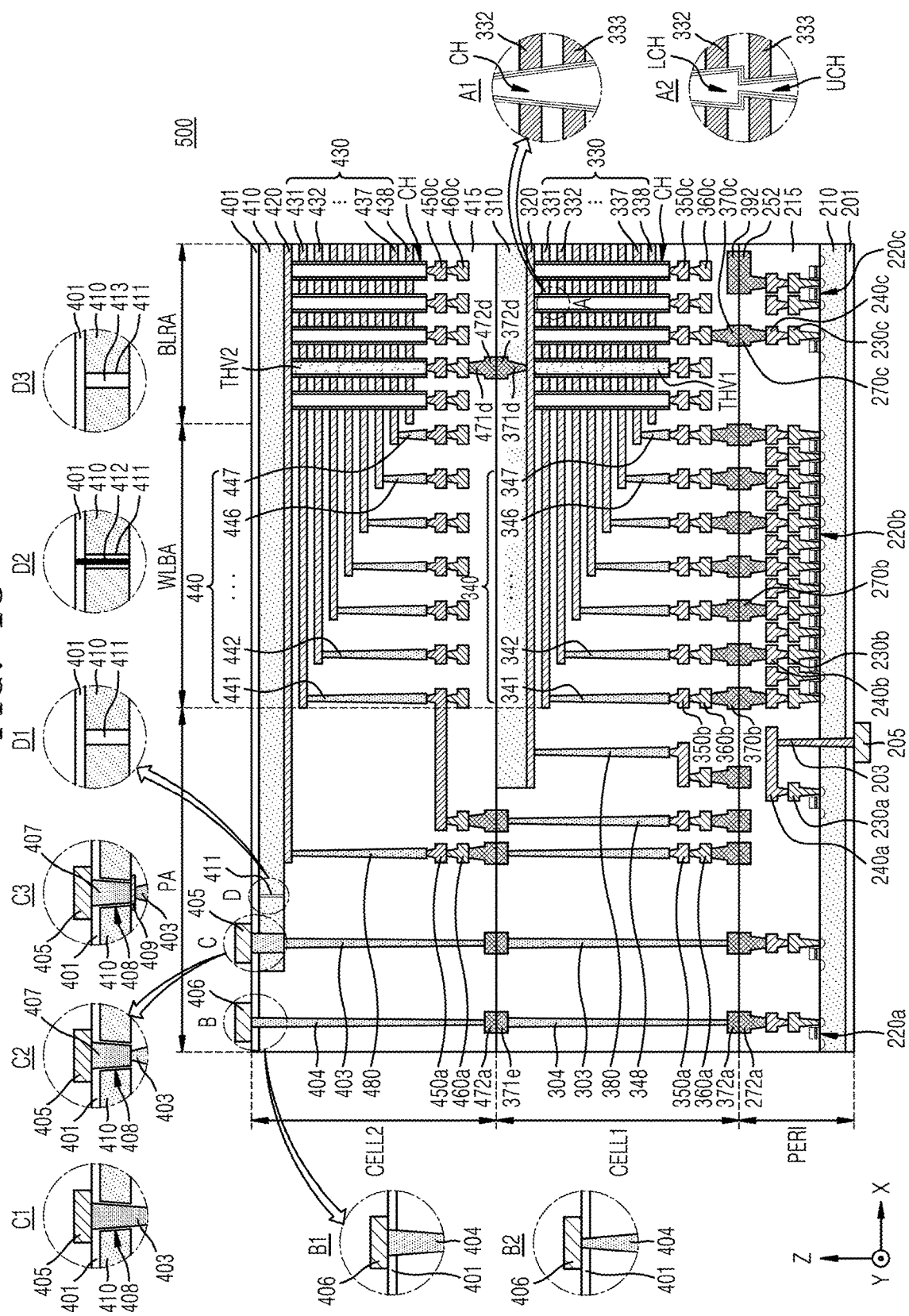
FIG. 13 is a cross-sectional view showing a memory device having a B-VNAND structure according to an example embodiment.

FIG. 13 is a cross-sectional view showing a memory device having a B-VNAND structure according to an example embodiment. Referring to FIG. 13, a memory device 400 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then connecting the upper chip and the lower chip in a bonding manner. In an implementation, the bonding manner may include a method of electrically connecting a bonding metal formed on an uppermost metal layer of the upper chip and a bonding metal formed on an uppermost metal layer of the lower chip. In an implementation, when the bonding metals may be formed of copper (Cu), the bonding manner may be a Cu—Cu bonding, and the bonding metals may also be formed of aluminum or tungsten.

Each of the peripheral circuit region PERI and the cell region CELL of the memory device 40 may include an external pad bonding area PA, a word line bonding area WLBA, and a bit line bonding area BLBA.

The peripheral circuit region PERI may include a first substrate 210, an interlayer insulating layer 215, a plurality of circuit elements 220a, 220b, and 220c formed on the first substrate 210, first metal layers 230a, 230b, and 230c respectively connected to the plurality of circuit elements 220a, 220b, and 220c, and second metal layers 240a, 240b, and 240c formed on the first metal layers 230a, 230b, and 230c. In an example embodiment, the first metal layers 230a, 230b, and 230c may be formed of tungsten having relatively high resistance, and the second metal layers 240a, 240b, and 240c may be formed of copper having relatively low resistance.

In an example embodiment illustrate in FIG. 13, although the first metal layers 230a, 230b, and 230c and the second metal layers 240a, 240b, and 240c are shown and described, one or more metal layers may be further formed on the second metal layers 240a, 240b, and 240c. At least a portion of the one or more metal layers formed on the second metal layers 240a, 240b, and 240c may be formed of aluminum or the like having a lower resistance than those of copper forming the second metal layers 240a, 240b, and 240c.

The interlayer insulating layer 215 may be disposed on the first substrate 210 and cover the plurality of circuit elements 220a, 220b, and 220c, the first metal layers 230a, 230b, and 230c, and the second metal layers 240a, 240b, and 240c. The interlayer insulating layer 215 may include an insulating material such as silicon oxide, silicon nitride, or the like.

Lower bonding metals 271b and 272b may be formed on the second metal layer 240b in the word line bonding area WLBA. In the word line bonding area WLBA, the lower bonding metals 271b and 272b in the peripheral circuit region PERI may be electrically connected to upper bonding metals 371b and 372b in the cell region CELL in a bonding manner, and the lower bonding metals 271b and 272b and the upper bonding metals 371b and 372b may be formed of aluminum, copper, tungsten, or the like.

The cell region CELL may include at least one memory block. The cell region CELL may include a second substrate 310 and a common source line 320. On the second substrate 310, a plurality of word lines 331 to 338 (e.g., 330) may be stacked in a direction (a Z-axis direction), perpendicular to an upper surface of the second substrate 310. At least one string select line and at least one ground select line may be arranged on and below the plurality of word lines 330, respectively, and the plurality of word lines 330 may be disposed between the at least one string select line and the at least one ground select line.

In the bit line bonding area BLBA, a channel structure CH may extend in a direction, perpendicular to the upper surface of the second substrate 310, and pass through the plurality of word lines 330, the at least one string select line, and the at least one ground select line. The channel structure CH may include a data storage layer, a channel layer, a buried insulating layer, and the like, and the channel layer may be electrically connected to a first metal layer 350c and a second metal layer 360c. In an implementation, the first metal layer 350c may be a bit line contact, and the second metal layer 360c may be a bit line. In an example embodiment, the bit line 360c may extend in a first direction (a Y-axis direction), parallel to the upper surface of the second substrate 310.

In an example embodiment illustrated in FIG. 13, an area in which the channel structure CH, the bit line 360c, and the like are disposed may be defined as the bit line bonding area BLBA. In the bit line bonding area BLBA, the bit line 360c may be electrically connected to the circuit elements 220c providing a page buffer 393 in the peripheral circuit region PERI. In an implementation, the bit line 360c may be connected to upper bonding metals 371c and 372c in the cell region CELL, and the upper bonding metals 371c and 372c may be connected to lower bonding metals 271c and 272c connected to the circuit elements 220c of the page buffer 393.

In the word line bonding area WLBA, the plurality of word lines 330 may extend in a second direction (an X-axis direction), parallel to the upper surface of the second substrate 310, and may be connected to a plurality of cell contact plugs 341 to 347 (e.g., 340). The plurality of word lines 330 and the plurality of cell contact plugs 340 may be connected to each other in pads provided by at least a portion of the plurality of word lines 330 extending in different lengths in the second direction. A first metal layer 350b and a second metal layer 360b may be connected to an upper portion of the plurality of cell contact plugs 340 connected to the plurality of word lines 330, sequentially. The plurality of cell contact plugs 340 may be connected to the circuit region PERI by the upper bonding metals 371b and 372b of the cell region CELL and the lower bonding metals 271b and 272b of the peripheral circuit region PERI in the word line bonding area WLBA.

The plurality of cell contact plugs 340 may be electrically connected to the circuit elements 220b providing a row decoder 394 in the peripheral circuit region PERI. In an example embodiment, operating voltages of the circuit elements 220b providing the row decoder 394 may be different than operating voltages of the circuit elements 220c providing the page buffer 393. In an implementation, operating voltages of the circuit elements 220c providing the page buffer 393 may be greater than operating voltages of the circuit elements 220b providing the row decoder 394.

A common source line contact plug 380 may be disposed in the external pad bonding area PA. The common source line contact plug 380 may be formed of a conductive material such as a metal, a metal compound, polysilicon, or the like, and may be electrically connected to the common source line 320. A first metal layer 350a and a second metal layer 360a may be stacked on an upper portion of the common source line contact plug 380, sequentially. In an implementation, an area in which the common source line contact plug 380, the first metal layer 350a, and the second metal layer 360a are disposed may be defined as the external pad bonding area PA.

Input-output pads 205 and 305 may be disposed in the external pad bonding area PA. Referring to FIG. 13, a lower insulating film 201 covering a lower surface of the first substrate 210 may be formed below the first substrate 210, and a first input-output pad 205 may be formed on the lower insulating film 201. The first input-output pad 205 may be connected to at least one of the plurality of circuit elements 220a, 220b, and 220c disposed in the peripheral circuit region PERI through a first input-output contact plug 203, and may be separated from the first substrate 210 by the lower insulating film 201. In addition, a side insulating film may be disposed between the first input-output contact plug 203 and the first substrate 210 to electrically separate the first input-output contact plug 203 and the first substrate 210.

Referring to FIG. 13, an upper insulating film 301 covering the upper surface of the second substrate 310 may be formed on the second substrate 310, and a second input-output pad 305 may be disposed on the upper insulating layer 301. The second input-output pad 305 may be connected to at least one of the plurality of circuit elements 220a, 220b, and 220c disposed in the peripheral circuit region PERI through a second input-output contact plug 303.

According to embodiments, the second substrate 310 and the common source line 320 may not be disposed in an area in which the second input-output contact plug 303 is disposed. Also, the second input-output pad 305 may not overlap the word lines 330 in the third direction (the Z-axis direction). Referring to FIG. 13, the second input-output contact plug 303 may be separated from the second substrate 310 in a direction, parallel to the upper surface of the second substrate 310, and may pass through the interlayer insulating layer 315 of the cell region CELL to be connected to the second input-output pad 305.

According to embodiments, the first input-output pad 205 and the second input-output pad 305 may be selectively formed. In an implementation, the memory device 400 may include only the first input-output pad 205 disposed on the first substrate 210 or the second input-output pad 305 disposed on the second substrate 310. Alternatively, the memory device 400 may include both the first input-output pad 205 and the second input-output pad 305.

A metal pattern in an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 400 may include a lower metal pattern 273a, corresponding to an upper metal pattern 372a formed in an uppermost metal layer of the cell region CELL, and having the same shape as the upper metal pattern 372a of the cell region CELL, in an uppermost metal layer of the peripheral circuit region PERI. In the peripheral circuit region PERI, the lower metal pattern 273a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 271b and 272b may be formed on the second metal layer 240b in the word line bonding area WLBA. In the word line bonding area WLBA, the lower bonding metals 271b and 272b of the peripheral circuit region PERI may be electrically connected to the upper bonding metals 371b and 372b of the cell region CELL by a Cu—Cu bonding.

Further, the bit line bonding area BLBA, an upper metal pattern 392, corresponding to a lower metal pattern 252 formed in the uppermost metal layer of the peripheral circuit region PERI, and having the same shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same shape as the metal pattern may be formed in an uppermost metal layer in another one of the cell region CELL and the peripheral circuit region PERI, and a contact may not be formed on the reinforcement metal pattern.

Figure 14:
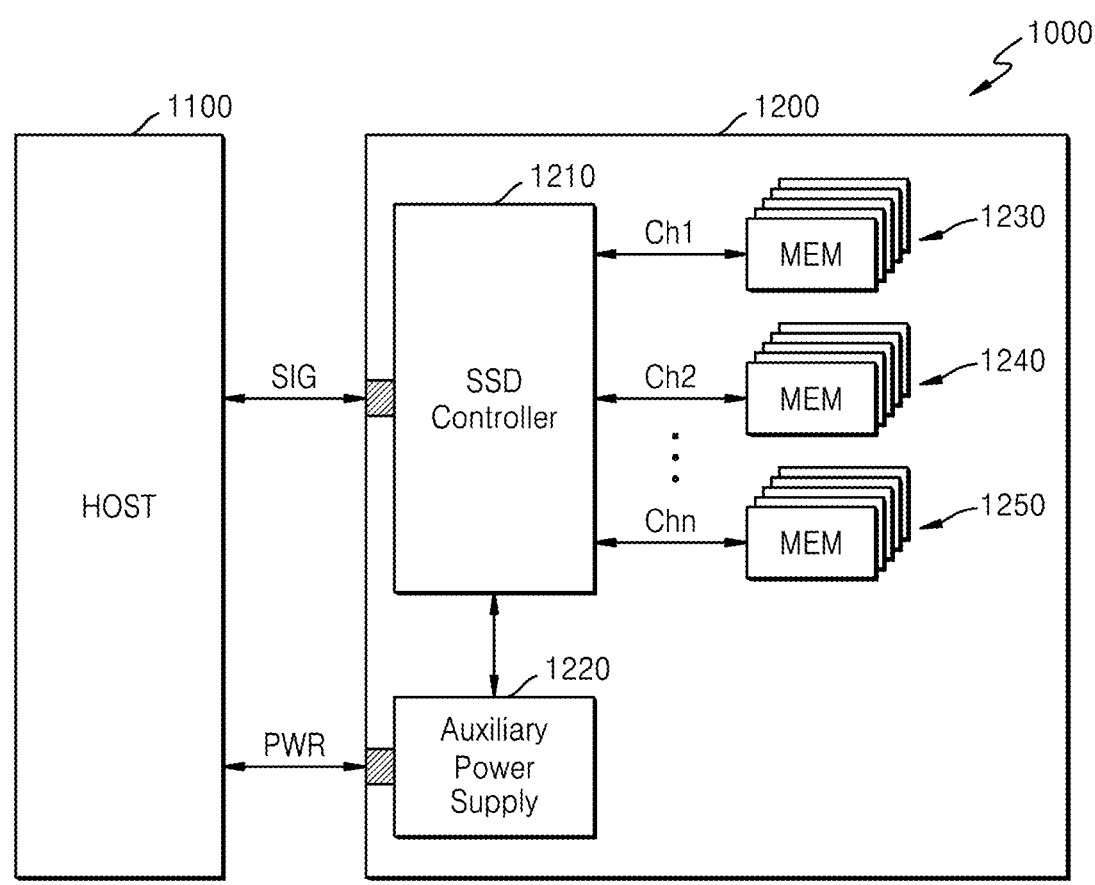
FIG. 14 is a block diagram showing a solid state drive system including a host exchanging signals with a solid state drive according to an example embodiment.

FIG. 14 is a block diagram showing a solid state drive system including a host exchanging signals with a solid state drive according to an example embodiment. Referring to FIG. 14, the SSD system 1000 may include a host 1100 and an SSD 1200. The SSD 1200 may exchange signals SIG with the host 1100 through a signal connector and may receive power PWR through a power connector. The SSD 1200 may include an SSD controller 1210, an auxiliary power supply 1220, and memory devices 1230, 1240, and 1250. The memory devices 1230, 1240, and 1250 may be vertically stacked NAND flash memory devices. In this regard, the SSD 1200 may be implemented using the embodiments described above with reference to FIGS. 1 to 13.

Figure 15:
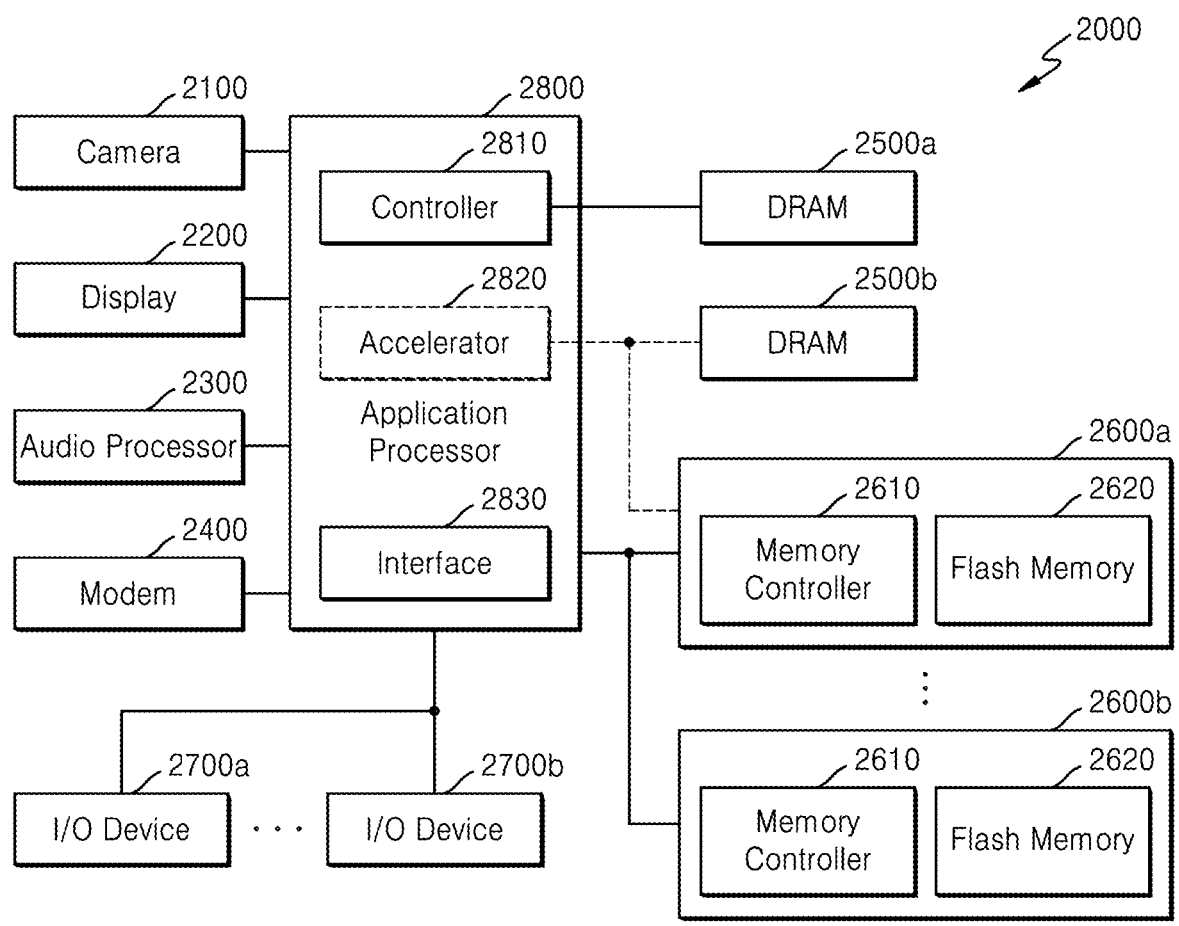
FIG. 15 is a block diagram showing a system including input/output devices, an application processor, and a plurality of memory devices according to an example embodiment.

FIG. 15 is a block diagram showing a system including input/output devices, an application processor, and a plurality of memory devices according to an example embodiment. Referring to FIG. 15, the system 2000 may include a camera 2100, a display 2200, an audio processor 2300, a modem 2400, first and second DRAMs 2500a and 2500b, first and second flash memories 2600a and 2600b, first and second I/O devices 2700a and 2700b, and an application processor (AP) 2800. The system 2000 may be implemented as a laptop computer, a mobile phone, a smart phone, a tablet PC, a wearable device, a healthcare device, or an IoT device. Also, the system 2000 may be implemented as a server or a PC.

The camera 2100 may capture a still image or a moving image under the control of a user, and may store or transmit the captured image/image data to the display 2200. The audio processor 2300 may process audio data included in the first and second flash memory devices 2600a and 2600b or network content. The modem 2400 may modulate and transmit a signal for transmission/reception of wired/wireless data, and may demodulate the signal to restore the original signal at the receiving side. The first and second I/O devices 2700a and 2700b may include devices providing digital input and/or output functions such as universal serial bus (USB), storage, a digital camera, a secure digital (SD) card, a digital versatile disc (DVD), a network adapter, a touch screen.

The AP 2800 may control overall operations of the system 2000. The AP 2800 may include a control block 2810, an accelerator block or accelerator chip 2820, and an interface block 2830. The AP 2800 may control the display 2200 to display part of the content stored in the first and second flash memory devices 2600a and 2600b on the display 2200. When a user input is received through the first and second I/O devices 2700a and 2700b, the AP 2800 may perform a control operation corresponding to the user input. The AP 2800 may include an accelerator block, which is a dedicated circuit for calculating artificial intelligence (AI) data, or may include an accelerator chip 2820 separate from the AP 2800. The second DRAM 2500b may be additionally mounted on the accelerator block or the accelerator chip 2820. An accelerator is a functional block that specializes in performing a specific function of the AP 2800, and may include a GPU which is a block that specializes in graphic data processing, a neural processing unit (NPU) which is a functional block that specializes in AI calculation and inference, and a data processing unit (DPU) which is a block that specializes in data transfer.

The system 2000 may include the plurality of DRAMs including the first and second DRAMs 2500a and 2500b. The AP 2800 may communicate with the first and second DRAMs 2500a and 2500b by controlling the first and second DRAMs 2500a and 2500b through MRS settings conforming to the JEDEC standard, or setting DRAM interface protocols to use company-specific functions such as low voltage/high speed/reliability and cyclic redundancy check (CRC)/error correction code (ECC) functions. In an implementation, the AP 2800 may communicate with the first DRAM 2500a through an interface conforming to the JEDEC standard such as LPDDR4 and LPDDR5, and the accelerator block or the accelerator chip 2820 may communicate with the second DRAM 2500b by setting a new DRAM interface protocol to control the second DRAM 2500b for accelerator having a higher bandwidth than the first DRAM 2500a.

FIG. 15 shows only the first and second DRAMs 2500a and 2500b, but when the bandwidth, response speed, and voltage conditions of the AP 2800 or the accelerator chip 2820 are satisfied, any memory such as PRAM, SRAM, MRAM, RRAM, FRAM, or hybrid RAM may be used. The first and second DRAMs 2500a and 2500b may have relatively smaller latency and bandwidth than the first and second I/O devices 2700a and 2700b or the first and second flash memories 2600a and 2600b. The first and second DRAMs 2500a and 2500b may be initialized when the system 2000 is powered on, loaded with operating system and application data, and used as temporary storage for the operating system and the application data or used as an execution space for various software codes.

Addition/subtraction/multiplication/division operations, a vector operation, an address operation, or a fast Fourier transform (FFT) operation may be performed within the first and second DRAMs 2500a and 2500b. In addition, a function for execution used for inference may be performed within the first and second DRAMs 2500a and 2500b. Here, inference may be performed in a deep learning algorithm using an artificial neural network. The deep learning algorithm may include a training operation of training a model through various data and an inference operation of identifying data with the trained model. As an embodiment, an image captured by a user through the camera 2100 may be signal-processed and stored in the second DRAM 2500b, and the accelerator block or the accelerator chip 2820 may perform an AI data operation of identifying data using data stored in the second DRAM 2500b and the function for execution used for inference.

The system 2000 may include a plurality of storage or the plurality of flash memories including the first and second flash memories 2600a and 2600b having a larger capacity than the first and second DRAMs 2500a and 2500b. The accelerator block or the accelerator chip 2820 may perform the training operation and the AI data operation using the first and second flash memories 2600a and 2600b. As an embodiment, the first and second flash memories 2600a and 2600b may include a memory controller 2610 and a flash memory device 2620, and may more efficiently perform the raining operation and the AI data operation performed by the AP 2800 and/or the accelerator chip 2820 using an operation unit included in the memory controller 2610. The first and second flash memories 2600a and 2600b may store photos taken through the camera 2100 or data transmitted through a data network. In an implementation, the first and second flash memories 2600a and 2600b may store augmented reality/virtual reality, high definition (HD), or ultra high definition (UHD) content.

In the system 2000, the AP 2800, the first and second DRAMs 2500a and 2500b, and the first and second flash memories 2600a and 2600b may include the data converter described with reference to FIGS. 1 to 12. The AP 2800, the first and second DRAMs 2500a and 2500b, and the first and second flash memories 2600a and 2600b may include a plurality of signal pins, an ODT circuit providing an ODT resistance to each of the plurality of signal pins, and a ZQ calibration circuit that outputs a code signal for controlling impedance of each of the plurality of signal pins. The code signal may be generated by a coarse code search operation and a fine code search operation. The ZQ calibration circuit may include a data converter performing the coarse code search operation and the fine code search operation, and perform the coarse code search operation in parallel during an offset cancellation operation of storing an offset voltage of the data converter in a capacitor.

By way of summation and review, a semiconductor device, and more particularly, an apparatus and a method for maintaining an impedance adjustment (ZQ) calibration operation time using a data converter cancelling an offset voltage of a comparator is disclosed.

To minimize the transmission time of signal provided between the memory controller and the memory device, the swing width of the signal is reduced. As the swing width of the signal decreases, the influence of external noise on a semiconductor chip increases, and signal reflection caused by an impedance mismatch is serious in an interface. To solve the impedance mismatch, the semiconductor chip has an impedance adjustment (ZQ) pin, and calibrates ZQ using an external resistor connected to the ZQ pin.

The memory controller performs a ZQ calibration operation on signal lines that transmit commands, addresses, and data provided to the memory device. The memory controller provides resistance Ron of an output driver with respect to each of the signal lines by performing the ZQ calibration operation. The memory device provides an on-die termination (ODT) resistance Rtt to a signal pin connected to each of the signal lines by performing the ZQ calibration operation. When the resistance Ron of the memory controller is the same as the resistance Rtt of the memory device, a signal having ideal global input/output (IO) signal characteristics may be loaded on signal lines between the memory controller and the memory device.

Meanwhile, the memory device includes a plurality of DQ pins connected to a plurality of data DQ lines among signal lines. A ZQ calibration circuit includes a comparator necessary to implement the adjustment of Rtt resistance values of the DQ pins. The comparator may compare the voltage level of a ZQ pin to a reference voltage level to generate a pull-up code and/or a pull-down code that provides the Rtt resistance values of the DQ pins. The comparison operation of the comparator changes the pull-up code and/or the pull-down code according to the influence of an offset voltage, which may cause errors in the Rtt resistance values of the DQ pins to occur. The Rtt resistance values of the DQ pins may have different signaling characteristics (e.g., input high level voltage (VIH), or output high level voltage (VOH)) according to their errors, and the performance of a memory device may be determined by a DQ pin having bad signaling characteristics.

The comparator may perform an operation of cancelling the offset voltage, and accordingly, a certain offset cancellation operation time may be required. When it is possible to hide the offset cancellation operating time of the comparator, errors in the Rtt resistance values may be reduced without increasing the ZQ calibration operating time, which will be beneficial to improve the performance of the memory device.

An apparatus and a method for maintaining an impedance adjustment (ZQ) calibration operating time using a data converter cancelling an offset voltage of a comparator is disclosed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made.

What is claimed is:

1. A memory device, comprising:
a plurality of signal pins;
an on-die termination circuit providing an on-die termination resistance to each of the plurality of signal pins; and
an impedance control calibration circuit configured to output a code signal for controlling impedance of each of the plurality of signal pins, the impedance control calibration circuit including a data converter configured to perform a coarse code search operation and a fine code search operation, the code signal being generated by the coarse code search operation and the fine code search operation,
wherein the impedance control calibration circuit is configured to perform the coarse code search operation in parallel during an offset cancellation operation of storing an offset voltage of the data converter in a capacitor.

2. The memory device as claimed in claim 1, wherein the data converter includes:
an autozeroing circuit including a plurality of gain circuits including a first amplification circuit and a first capacitor connected to the first amplification circuit, the autozeroing circuit performing a switch feedthrough offset cancellation operation of storing an offset voltage of the autozeroing circuit in the capacitor through a switch;
a comparator circuit including a first input terminal and a second input terminal, the comparator circuit comparing a first input terminal voltage level of the first input terminal with a second input terminal voltage level of the second input terminal;
a first switch unit connected between the autozeroing circuit and the comparator circuit, the first switch unit disconnecting the autozeroing circuit from the comparator circuit during the switch feedthrough offset cancellation operation of the autozeroing circuit; and
a second switch unit connected between an impedance control signal pin and a reference voltage line and the comparator circuit, the second switch unit connecting the impedance control signal pin and the reference voltage line to the first input terminal of the comparator circuit and the first input terminal of the comparator circuit during the switch feedthrough offset cancellation operation of the autozeroing circuit.

3. The memory device as claimed in claim 2, wherein after completion of the switch feedthrough offset cancellation operation of the autozeroing circuit, the first amplification circuit of the autozeroing circuit is connected to the impedance control signal pin and the reference voltage line, the autozeroing circuit is connected to the comparator circuit through the first switch unit, and the impedance control signal pin and the reference voltage line are disconnected from the comparator circuit by the second switch unit.

4. The memory device as claimed in claim 2, wherein:
the autozeroing circuit has a structure in which the plurality of gain circuits are cascaded, and
each of the plurality of gain circuits further includes:
the first amplification circuit including first and second input terminals and first and second output terminals;
the first capacitor and a second capacitor connected to the first and second output terminals of the first amplification circuit, respectively;
a first switch connected to both ends of the first capacitor, the first switch being turned on in response to a purge signal;
a second switch connected to both ends of the second capacitor, the second switch being turned on in response to the purge signal;
a third switch connected between a common voltage and one end of the first capacitor, the third switch being turned on in response to a first clock signal; and
a fourth switch connected between the common voltage and one end of the second capacitor, the fourth switch being turned on in response to the first clock signal.

5. The memory device as claimed in claim 2, wherein:
the autozeroing circuit has a structure in which the plurality of gain circuits are cascaded,
each of the plurality of gain circuits includes:
the first amplification circuit including first and second input terminals and first and second output terminals;
the first capacitor and a second capacitor being connected to the first and second input terminals of the first amplification circuit, respectively;
a third switch connected between a first input terminal and a first output terminal of the first amplification circuit, the third switch being turned on in response to a clock signal; and
a fourth switch connected between a second input terminal and a second output terminal of the first amplification circuit, the fourth switch being turned on in response to the clock signal.

* * * * *